(12) United States Patent
Soroush et al.

(10) Patent No.: US 12,101,357 B2
(45) Date of Patent: Sep. 24, 2024

(54) SYSTEM AND METHOD FOR CONSTRUCTING A GRAPH-BASED MODEL FOR OPTIMIZING THE SECURITY POSTURE OF A COMPOSED INTERNET OF THINGS SYSTEM

(71) Applicant: Palo Alto Research Center Incorporated, Palo Alto, CA (US)

(72) Inventors: Hamed Soroush, San Jose, CA (US); Milad Asgari Mehrabadi, Irvine, CA (US); Shantanu Rane, Menlo Park, CA (US); Massimiliano Albanese, Potomac, MD (US)

(73) Assignee: Xerox Corporation, Norwalk, CT (US)

( * ) Notice: Subject to any disclaimer, the term of this patent is extended or adjusted under 35 U.S.C. 154(b) by 570 days.

(21) Appl. No.: 16/918,971

(22) Filed: Jul. 1, 2020

(65) Prior Publication Data
US 2021/0012012 A1  Jan. 14, 2021

Related U.S. Application Data

(60) Provisional application No. 62/873,746, filed on Jul. 12, 2019.

(51) Int. Cl.
*H04L 9/40* (2022.01)
*G06F 16/25* (2019.01)
(Continued)

(52) U.S. Cl.
CPC .......... *H04L 63/205* (2013.01); *G06F 16/252* (2019.01); *G06F 21/577* (2013.01);
(Continued)

(58) Field of Classification Search
CPC . H04L 63/205; H04L 63/1433; G06F 16/252; G06F 21/577; G06F 2221/034;
(Continued)

(56) References Cited

U.S. PATENT DOCUMENTS

| | | | |
|---|---|---|---|
| 6,742,128 B1 * | 5/2004 | Joiner | H04L 63/1433 726/25 |
| 7,013,395 B1 * | 3/2006 | Swiler | H04L 63/1433 713/153 |

(Continued)

FOREIGN PATENT DOCUMENTS

| | | | | |
|---|---|---|---|---|
| CN | 106991325 A | * | 7/2017 | G06F 21/577 |
| CN | 106997437 A | * | 8/2017 | G06F 21/577 |

(Continued)

OTHER PUBLICATIONS

Gemini George, A Graph-Based Security Framework for Securing Industrial IoT Networks From Vulnerability Exploitations, IEEE Access (vol. 6, pp. 43586-43601), Jan. 1, 2018, 16 pages (Year: 2018).*

(Continued)

*Primary Examiner* — Shahriar Zarrineh

(57) ABSTRACT

Embodiments provide a system and method for constructing a graph-based model for optimizing the security posture of a composed system. During operation, the system constructs a multi-layer graph for a system with a plurality of components, wherein the multi-layer graph comprises a configuration subgraph, a vulnerability subgraph, and a dependency subgraph. The system constructs the multi-layer graph by the following. The system generates nodes in the configuration subgraph, including: nodes in a first class which encode information associated with a configuration parameter for a respective component, wherein the encoded information includes a name, a default value, a range of values, and a data type; and nodes in a second class which encode value assignments for configuration parameters and relationships between configuration parameters. The system generates nodes in the vulnerability subgraph based on known (Continued)

vulnerabilities associated with a component, bad security practices, and best security practices.

23 Claims, 9 Drawing Sheets
(5 of 9 Drawing Sheet(s) Filed in Color)

(51) Int. Cl.
*G06F 21/57* (2013.01)
*G06N 3/04* (2023.01)
*G06N 5/04* (2023.01)

(52) U.S. Cl.
CPC ............... *G06N 3/04* (2013.01); *G06N 5/04* (2013.01); *H04L 63/1433* (2013.01); *G06F 2221/034* (2013.01)

(58) Field of Classification Search
CPC . G06F 21/57; G06N 3/04; G06N 5/04; G06N 5/022
See application file for complete search history.

(56) References Cited

U.S. PATENT DOCUMENTS

| | | | | |
|---|---|---|---|---|
| 7,627,900 B1* | 12/2009 | Noel | ..................... | H04L 41/12 709/224 |
| 9,215,158 B1* | 12/2015 | Adogla | ................ | G06F 11/008 |
| 9,317,692 B2* | 4/2016 | Elder | ................... | H04L 63/1433 |
| 9,705,978 B1* | 7/2017 | Kenigsberg | ........... | H04L 43/045 |
| 9,736,173 B2* | 8/2017 | Li | ...................... | H04L 63/1416 |
| 10,313,382 B2* | 6/2019 | Noel | .................. | H04L 63/1433 |
| 10,516,761 B1* | 12/2019 | A | ........................... | H04L 43/06 |
| 10,771,489 B1* | 9/2020 | Bisht | ...................... | G06N 20/00 |
| 10,812,499 B2* | 10/2020 | Hassanzadeh | ...... | H04L 63/1433 |
| 10,904,270 B2* | 1/2021 | Muddu | ............... | G06V 10/225 |
| 11,265,292 B1* | 3/2022 | Leviseur | ............ | H04L 63/1433 |
| 2006/0265324 A1* | 11/2006 | Leclerc | .............. | H04L 63/1433 705/38 |
| 2007/0011319 A1* | 1/2007 | McClure | ................ | H04L 41/12 709/224 |
| 2008/0098479 A1* | 4/2008 | O'Rourke | .......... | H04L 63/1433 726/25 |
| 2008/0172716 A1* | 7/2008 | Talpade | ................. | H04L 63/20 726/1 |
| 2009/0077666 A1* | 3/2009 | Chen | .................... | G06F 21/577 726/25 |
| 2009/0265199 A1* | 10/2009 | Moerdler | .......... | G06Q 10/0637 705/7.39 |
| 2010/0095381 A1* | 4/2010 | Levi | .................... | H04L 63/1433 726/25 |
| 2010/0192195 A1* | 7/2010 | Dunagan | ............... | G06F 21/577 726/1 |
| 2013/0232331 A1* | 9/2013 | Farhan | .................. | G06F 11/328 713/100 |
| 2013/0247205 A1* | 9/2013 | Schrecker | ............ | G06F 21/577 726/25 |
| 2015/0244734 A1* | 8/2015 | Olson | .................. | G06F 21/577 726/25 |
| 2016/0050116 A1* | 2/2016 | Sheshadri | ............ | H04L 67/125 709/221 |
| 2017/0078320 A1* | 3/2017 | Hughes | .............. | H04L 63/1433 |
| 2017/0177740 A1* | 6/2017 | Abaya | ................ | G06F 16/9024 |
| 2017/0195349 A1* | 7/2017 | Shabtai | .............. | H04L 63/1433 |
| 2017/0286690 A1* | 10/2017 | Chari | .................... | G06F 21/577 |
| 2017/0289187 A1* | 10/2017 | Noel | .................. | G06F 16/9024 |
| 2017/0324768 A1* | 11/2017 | Crabtree | ............ | H04L 63/1433 |
| 2018/0210927 A1* | 7/2018 | Karam | ................ | G06F 16/9024 |
| 2018/0322407 A1* | 11/2018 | Baum | .................... | G06N 7/005 |
| 2020/0053116 A1* | 2/2020 | Soroush | ................ | H04L 43/045 |
| 2020/0110774 A1* | 4/2020 | Lakshmanan | ............ | G06N 3/08 |
| 2020/0175174 A1* | 6/2020 | Bakalli | ..................... | G06F 8/71 |
| 2020/0177608 A1* | 6/2020 | Okunlola | ............ | H04L 63/1425 |
| 2022/0263860 A1* | 8/2022 | Crabtree | ............ | H04L 63/1408 |
| 2023/0153355 A1* | 5/2023 | Crabtree | ............ | G06F 16/2272 706/45 |

FOREIGN PATENT DOCUMENTS

| | | | | |
|---|---|---|---|---|
| CN | 107038380 A | * | 8/2017 | .......... G06F 11/3676 |
| CN | 107066256 A | * | 8/2017 | .......... G06F 16/288 |
| CN | 108123962 A | * | 6/2018 | ............. H04L 41/14 |
| CN | 110138788 A | * | 8/2019 | .......... H04L 41/145 |
| CN | 110188871 A | * | 8/2019 | ............... G06N 3/04 |
| CN | 110191120 A | * | 8/2019 | |
| CN | 107135221 B | * | 5/2020 | ............. H04L 63/10 |
| CN | 111611586 A | * | 9/2020 | |
| CN | 112766374 A | * | 5/2021 | |
| KR | 102079970 B1 | * | 7/2020 | |
| WO | WO-0070463 A1 | * | 11/2000 | ............. G06F 21/57 |
| WO | WO-2007143226 A2 | * | 12/2007 | ........ H04L 63/1433 |
| WO | WO-2019186722 A1 | * | 10/2019 | ............. G06F 21/57 |

OTHER PUBLICATIONS

Brigitte Boden, Mining Coherent Subgraphs in Multi-Layer Graphs with Edge Labels, Data Management and Data Exploration Group RWTH Aachen University, Germany, Proceedings of the 18th ACM SIGKDD international conference on Knowledge discovery and data mining, Aug. 2012 pp. 1258-1266 (Year: 2012).*

Ibifubara Iganibo, Vulnerability Metrics for Graph-based Configuration Security, 2021, Center for Secure Information Systems, George Mason University, Fairfax, U.S.A. ,Palo Alto Research Center, Palo Alto, U.S.A , 12 pages (Year: 2021).*

Massimiliano Albanese, A Graphical Model to Assess the Impact of Multi-Step Attacks, Journal of Defense Modeling and Simulation: Applications, Methodology, Technology, 2018, vol. 15(1) 79-93 (Year: 2018).*

Mridul Sankar Barik, A Graph Data Model for Attack Graph Generation and Analysis, Dept. of Comp. Sc. and Engg., Jadavpur University Kolkata, India {msbarik,chandanm}@cse.jdvu.ac.in. 2014, 12 pages (Year: 2014).*

Ushil Jajodia and Steven Noel , "Advanced Cyber Attack Modeling, Analysis, and Visualization", George Mason University, AFRL-RI-RS-TR-2010-078 , Final Technical Report, Mar. 2010 (Year: 2010).*

Wenhao He, "Unknown Vulnerability Risk Assessment Based on Directed Graph Models: A Survey", Published in: IEEE Access (vol. 7), Date of Publication: Nov. 19, 2019, pp. 168201-168225 (Year: 2019).*

Igor Kotenko, "A Cyber Attack Modeling and Impact Assessment framework", Published in: 2013 5th International Conference on Cyber Conflict (CYCON 2013), Date of Conference: Jun. 4-7, 2013, 24 pages (Year: 2013).*

* cited by examiner

SYSTEM AND METHOD FOR CONSTRUCTING A GRAPH-BASED MODEL FOR OPTIMIZING THE SECURITY POSTURE OF A COMPOSED INTERNET OF THINGS SYSTEM

RELATED APPLICATIONS

This application claims the benefit of:

U.S. Provisional Application No. 62/873,746, entitled "System and Method for Improving the Security Versus Functionality Tradeoff of a Composed Internet of Things System," by inventors Hamed Soroush and Shantanu Rane, filed Jul. 2019, which subject matter is related to the subject matter in U.S. patent application Ser. No. 16/219,774, entitled "Method for Improving the Security of a Networked System by Adjusting the Configuration Parameters of the System Components," by inventors Hamed Soroush and Shantanu Rane, filed 13 Dec. 2018, and issued on 1 Jun. 2021 as U.S. Pat. No. 11,025,661 (hereinafter "U.S. Pat. No. 11,025,661"), which application claims the benefit of U.S. Provisional Application No. 62/718,328, titled "Method for Improving the Security of a Networked System by Adjusting the Configuration Parameters of the System Components," by inventors Hamed Soroush and Shantanu Rane, filed 13 Aug. 2018; and is further related to U.S. patent application Ser. No. 16/918,966, entitled "SYSTEM AND METHOD FOR EXTRACTING CONFIGURATION INFORMATION FOR REASONING ABOUT THE SECURITY AND FUNCTIONALITY OF A COMPOSED INTERNET OF THINGS SYSTEM," by inventors Hamed Soroush, Milad Asgari Mehrabadi, and Shantanu Rane, filed concurrently with this application, issued on 15 Aug. 2023 as U.S. Pat. No. 11,729,222 (hereinafter "U.S. Pat. No. 11,729,222"), the disclosures of which are herein incorporated by reference in their entirety.

STATEMENT OF GOVERNMENT-FUNDED RESEARCH

This invention was made with U.S. government support under (Contract Number) Award Number: FA8750-18-2-0147 awarded by the Defense Advanced Research Projects Agency (DARPA) of the Department of Defense (DoD). The U.S. government has certain rights in the invention.

BACKGROUND

Field

This disclosure is generally related to improving the security versus functionality tradeoff. More specifically, this disclosure is related to a system and method for constructing a graph-based model for optimizing the security posture of a composed Internet of Things (IOT) system.

Related Art

As cybersystems become increasingly complex and connected, configuration analytics may play a critical role in the correct and secure operation of cybersystems or composed systems (e.g., a networked Industrial Control System (ICS) or an Internet of Things (IOT) system). Given the significant number of interconnected components in a composed system, providing the appropriate level of security for such networked systems may pose a challenge. For example, a majority of the security compromises in IoT systems can be attributed to misconfigurations, i.e., combinations of configuration parameters of the individual system components that expose vulnerabilities to an adversary. Attackers may rely on unpatched vulnerabilities and configuration errors to gain unauthorized access to system resources. Misconfigurations can occur at any level of a system's software architecture. Thus, correctly configuring systems can become increasingly complex given multiple interconnected systems.

Current solutions may focus narrowly on tuning the configuration parameters of individual system components. However, these solutions lack a principled approach to managing the complex relationships between the configuration parameters of the many components of a composed system, and do not leverage the complex relationships among the configuration parameters of the individual system components. These solutions do not account for the dependencies among the configuration parameters of the interconnected system components or devices. Furthermore, current solutions do not provide a principled approach to account for the effect of configuration parameters on the attack sequences that are available to an adversary, nor do they provide functional dependencies between the interconnected system components or devices.

SUMMARY

The embodiments described herein provide a system and method for constructing a graph-based model for optimizing the security posture of a composed system. During operation, the system constructs a multi-layer graph for a system with a plurality of components, wherein the multi-layer graph comprises a configuration subgraph, a vulnerability subgraph, and a dependency subgraph. The system constructs the multi-layer graph by performing the following operations. The system generates nodes in the configuration subgraph, including: nodes in a first class which encode information associated with a configuration parameter for a respective component, wherein the encoded information includes a name, a default value, a range of values, and a data type; and nodes in a second class which encode value assignments for configuration parameters and relationships between configuration parameters. The system generates nodes in the vulnerability subgraph based on known vulnerabilities associated with a component, bad security practices, and best security practices.

In some embodiments, a component includes one or more of: a software component; a hardware component; a middleware component; and a networking component.

In some embodiments, the system generates the nodes for the vulnerability subgraph by: the system identifies and encodes a negation of the known vulnerabilities associated with a component as a first set of known vulnerabilities, wherein the first set of known vulnerabilities are obtained from a public or a proprietary database; the system identifies the bad security practices and encodes the bad security practices as a second set of known vulnerabilities; and the system identifies the best security practices and encodes a negation of the best security practices as a third set of known vulnerabilities.

In some embodiments, generating the nodes for the vulnerability subgraph is further based on combining information from network scanners and vulnerability databases.

In some embodiments, the vulnerability subgraph includes directed edges between pairs of vulnerability subgraph nodes. A vulnerability subgraph node represents a known vulnerability or a security condition. A directed edge from a first vulnerability subgraph node to a second vulnerability subgraph node indicates that exploiting the first vulnerability subgraph node creates preconditions for exploiting the second vulnerability subgraph node. A respective directed edge is associated with a probability value.

In some embodiments, the probability value indicates a likelihood that the respective directed edge will be traversed in an attack or by an attacker. The system determines the probability value based on one or more of: a skill level of the attacker relative to a complexity of a security condition associated with the second vulnerability subgraph node; resources and time available to the attacker; and metrics based on the Common Vulnerability Scoring System (CVSS).

In some embodiments, the system generates nodes in the dependency subgraph. The dependency subgraph includes directed edges between pairs of dependency subgraph nodes. A dependency subgraph node represents a respective component of the system and is labeled with a dependency type and a number representing a value associated with the respective component. A directed edge from a first dependency subgraph node to a second dependency subgraph node indicates that the first dependency subgraph node depends upon the second dependency subgraph node.

In some embodiments, the value associated with the respective component indicates an importance to the system of the respective component or the dependency subgraph node. The dependency type labeled on the dependency subgraph node indicates a category of dependency relationships and includes one or more of: a redundancy type, wherein the respective component depends on a redundant pool of resources; a strict dependence type, wherein the respective component strictly depends on a first pool of other components, and wherein if a single component of the first pool of other components fails, the respective component fails to deliver any value; and a graceful degradation type, wherein the respective component depends on a second pool of other components, and wherein if a single component of the second pool of other components fails, the system continues to operate with a degraded performance.

In some embodiments, a directed edge from a dependency subgraph node to a configuration subgraph node in the first class indicates a list of configuration parameters associated with a component associated with the dependency subgraph node.

In some embodiments, a directed edge from a configuration subgraph node in the second class to a vulnerability subgraph node indicates a constraint in the second class configuration subgraph node which creates a precondition to exploit a vulnerability indicated by the vulnerability subgraph node.

In some embodiments, a directed edge from a vulnerability subgraph node to a dependency subgraph node indicates an exposure factor of a respective component to an exploitation of a vulnerability indicated by the vulnerability subgraph node.

In some embodiments, the system calculates an impact of a multiple-step attack of the system, by: defining an impact function for a single attack step based on a relative residual utility of a respective component before and after exploitation of a first vulnerability and further based on an original utility of the respective component, wherein the impact of the exploitation of the first vulnerability is based on other vulnerabilities exploited in prior attack steps and a corresponding impact on the system, and wherein, in the multiple-step attack, a utility of each component of the system decreases after each attack step.

In some embodiments, calculating the impact of the multiple-step attack of the system further comprises one or more of: defining a first attack surface metric based on a likelihood and a potential impact of each of a plurality of attack paths, wherein a respective attack path can be traversed in a step of the multiple-step attack of the system, and wherein the respective attack path comprises at least: a first node in the vulnerability subgraph; a directed edge from the first node in the vulnerability subgraph to a second node in the dependency subgraph; and the second node in the dependency subgraph; analyzing one or more attack paths based on probability values associated with directed edges between nodes which comprise a respective attack path; and defining a second attack surface metric based on assessing an impact of multiple steps of a multiple-step attack executed concurrently, wherein, at each step, all vulnerabilities for which preconditions are satisfied are exploited with a probability of one.

In some embodiments, the system displays, on a screen of a user device, one or more interactive elements which allow the user to: view the constructed multi-layer graph comprising at least the configuration subgraph and the generated configuration subgraph nodes, the vulnerability subgraph and the generated vulnerability subgraph nodes, the dependency subgraph and generated dependency subgraph nodes, and directed edges between nodes in a same subgraph or between nodes in different subgraphs; select one or more attack paths; and view an impact of the one or more attack paths executed sequentially or executed concurrently

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
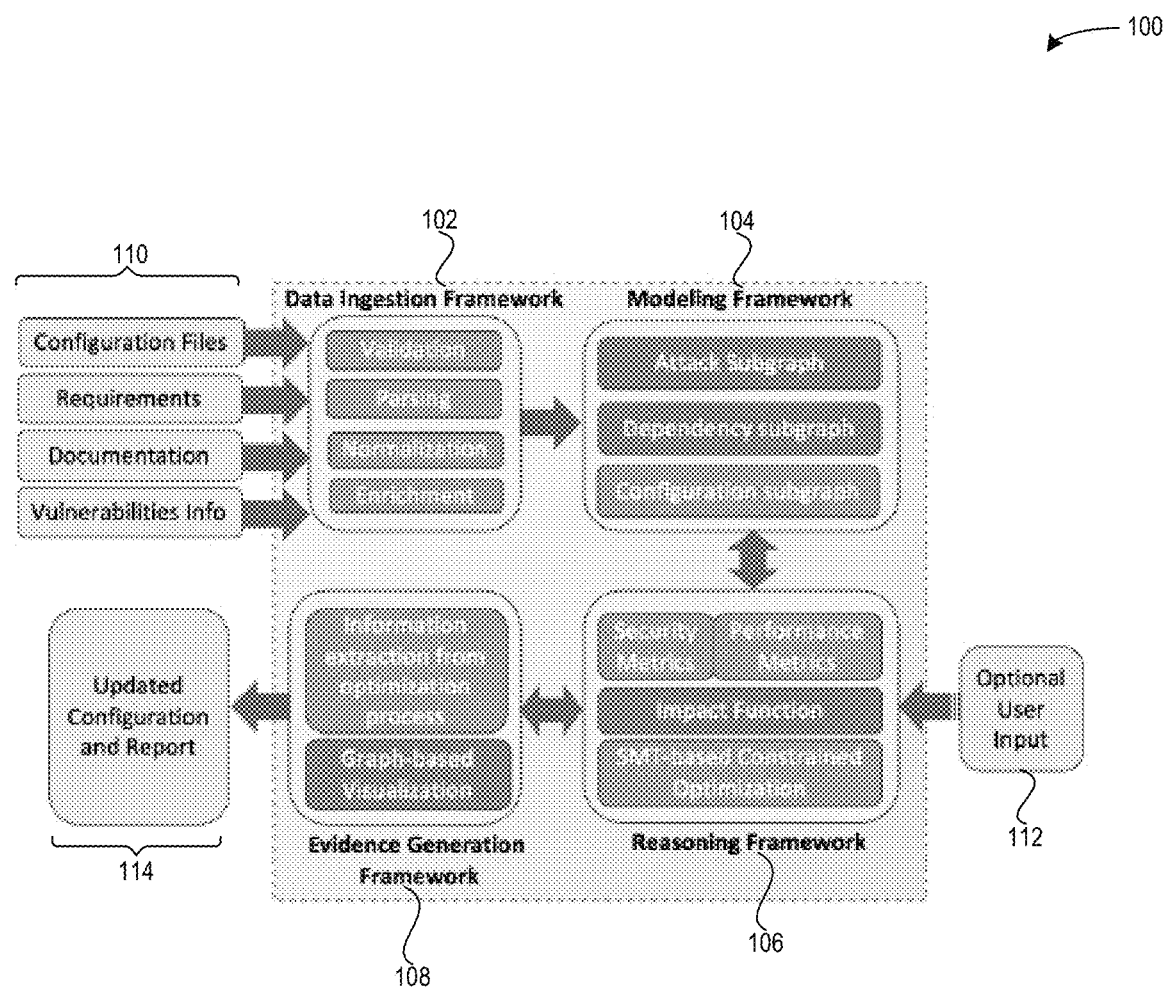
FIG. 1 illustrates an exemplary environment for facilitating an improvement in the security versus functionality tradeoff of a composed system, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

The embodiments described herein provide a system which constructs a graph-based model for optimizing the security posture of a composed system. Constructing the graph-based model can be part of a modeling framework or module, as one of four modules of a larger system described in U.S. Pat. No. 11,025,661. This larger or overall system can be referred to as secure configurations for the IoT based on optimization and reasoning on graphs (or "SCIBORG"). The overall system can include the following four frameworks: (1) a data ingestion framework; (2) a modeling framework; (3) a reasoning framework; and (4) an evidence generation framework, as summarized below in relation to FIG. 1.

The overall system can model a composed system by constructing a multi-layer graph for a system with a plurality of components. The multi-layer graph can include: a dependency subgraph that captures the functional relationships among system components; a configuration subgraph that accounts for relationships among configuration parameters within and across components; and an attack or vulnerability subgraph modeling the vulnerabilities of the system and the user of those vulnerabilities in multi-step attacks.

As described above, current solutions which work on minimizing the attack surface of a system do not capture the intricate relationships between configuration parameters, attack paths available to an adversary, and functional dependencies among system components. Thus, current solutions generally fail to reduce the risk associated with residual vulnerabilities. The overall system addresses these issues by characterizing the potential impact of multi-step attacks enabled by configuration settings.

The overall system also uses algorithms and software tools to jointly analyze the subgraphs of the multi-layer graph in order to reason about the impact of a candidate configuration set on the security and functionality of the composed system, e.g., by using a Satisfiability Modulo Theory (SMT) solver to express the complex relationships among the configuration parameters as constraints in a security optimization problem.

The overall system can be implemented with a scalable pipeline, which can: ingest system requirements, configuration files, software documentation and various types of configuration vulnerabilities (data ingestion framework); based on the data ingested in the data ingestion framework, build a queryable, graph-based representation of the relationships between configuration vulnerabilities and attack scenarios, configuration parameters, and system components (modeling framework); provide an application programming interface (API) to perform a quantitative, comparative analysis of the security impact of configuration settings (reasoning framework); automatically construct a constraint satisfaction problem based on the model and utilize a Z3 SMT solver to solve for optimal parameter values (reasoning framework); and provide human-readable evidence about the optimality of the selected configuration (evidence generation framework).

In the embodiments described herein, the modeling framework of the overall system can construct a multi-layer graph for a system with a plurality of components. The components can include, e.g., a software component, a hardware component, a middleware component, and a networking component. The constructed multi-layer graph can include a configuration subgraph, a vulnerability subgraph, and a dependency subgraph. The modeling framework can construct the multi-layer graph by generating nodes in each of the three subgraphs as well as directed edges between nodes in a same graph or between nodes in different subgraphs.

In the configuration subgraph, the modeling framework can generate nodes in a first class and a second class. The nodes in the first class can encode information associated with a configuration parameter for a respective component. Examples of the encoded information can include: a name for the respective component; a default value for the respective component; a range of values for the respective component; and a data type for the respective component. The nodes in the second class can encode value assignments for configuration parameters and relationships between configuration parameters, including: relationships among configuration parameters within components; and relationships among configuration parameters across components.

In the vulnerability subgraph, the modeling framework can generate nodes by identifying and encoding three types of vulnerabilities. First, the modeling framework can identify and encode known vulnerabilities associated with a component as a first set of known vulnerabilities, which are obtained from a public or a proprietary database (e.g., from the National Vulnerability Database or an IoT search engine such as Shodan, as described in U.S. Pat. No. 11,729,222). The modeling framework can also identify both bad security practices and best security practices, e.g., based on expert domain knowledge or user input. The modeling framework can encode the bad security practices as a second set of known vulnerabilities, and can encode a negation of the best security practices (i.e., "not-best security practices") as a third set of known vulnerabilities.

In the dependency subgraph, the modeling framework can generate nodes, wherein each node represents a respective component of the system and is labeled with a dependency type and a number representing a value associated with the respective component. An exemplary multi-layer graph which includes the three subgraphs along with their respective nodes and directed edges is described below in relation to FIG. 2B.

The generated multi-layer graph model of the system can represent, e.g., the composed IoT system, and can include three subgraphs (a configuration subgraph, an attack subgraph, and a dependency subgraph), as described in U.S. Pat. No. 11,025,661. The modeling framework can take as input the data ingested and extracted by the data ingestion module. As described in U.S. Pat. No. 11,729,222, extracted configuration information can be used to generate the configuration subgraph, extracted vulnerability information can be used to generate the vulnerability subgraph, and extracted dependency information can be used to generate the dependency subgraph.

The terms "framework" and "module" are used interchangeably in this disclosure, and refer to a component or unit of the "overall system" or "SCIBORG." A framework or module can be associated with various operations and functions, as described herein.

The term "overall system" refers to SCIBORG, which includes the four frameworks (i.e., data ingestion framework, modeling framework, reasoning framework, and evidence generation framework). The terms "modeling framework" and "modeling module" are used interchangeably in this disclosure, and refer to one of the four frameworks of the overall system or SCIBORG. The term "system" can refer to the overall system or the modeling module/framework.

The terms "vulnerability graph" and "attack graph" are used interchangeably in this disclosure, and refer to one of the three subgraphs of the generated multi-layer graph.

The terms "graph" and "subgraph" are used interchangeably in this disclosure to describe the three graphs or subgraphs which make up the generated multi-layer graph of the described embodiments, i.e.: the configuration graph or subgraph; the vulnerability graph or subgraph; and the dependency graph or subgraph.

The terms "node" and "vertex" are used interchangeably in this disclosure, and refer to a point, unit, or object in a graph or subgraph.

High-Level Overview of System with Four Frameworks/Modules

FIG. 1 illustrates an exemplary environment 100 for facilitating an improvement in the security versus functionality tradeoff of a composed system, in accordance with an embodiment of the present application. Environment 100 can depict or indicate the overall system or SCIBORG. The overall system can include a data ingestion framework 102, a modeling framework 104, a reasoning framework 106, and an evidence generation framework 108. Data ingestion framework 102 can determine information sources associated with software, hardware, middleware, and networking components of a system, and can further receive data from those information sources as input (e.g., input 110 which can include configuration files, functional requirements, documentation, and vulnerabilities information).

Modeling framework 104 can take as input information obtained, ingested, and extracted by data ingestion framework 102, and can produce as output three subgraphs which comprise the multi-layer graph described herein: an attack subgraph 122; a dependency subgraph 124; and a configuration subgraph 126. A detailed flow of the operations performed by modeling framework 104 is described below in relation to FIGS. 2B, 3, 5, 6A, and 6B. Reasoning framework 106 can use the constructed multi-layer graph output by modeling framework 104, and reasoning framework 106 can also receive an optional user input 112. Evidence generation framework 108 can use as input the output of reasoning framework 106, and evidence generation framework 108 can produce as output an updated configuration and report 114.

Exemplary Network Diagram and Corresponding Multi-Layer Graph

Figure 2A:
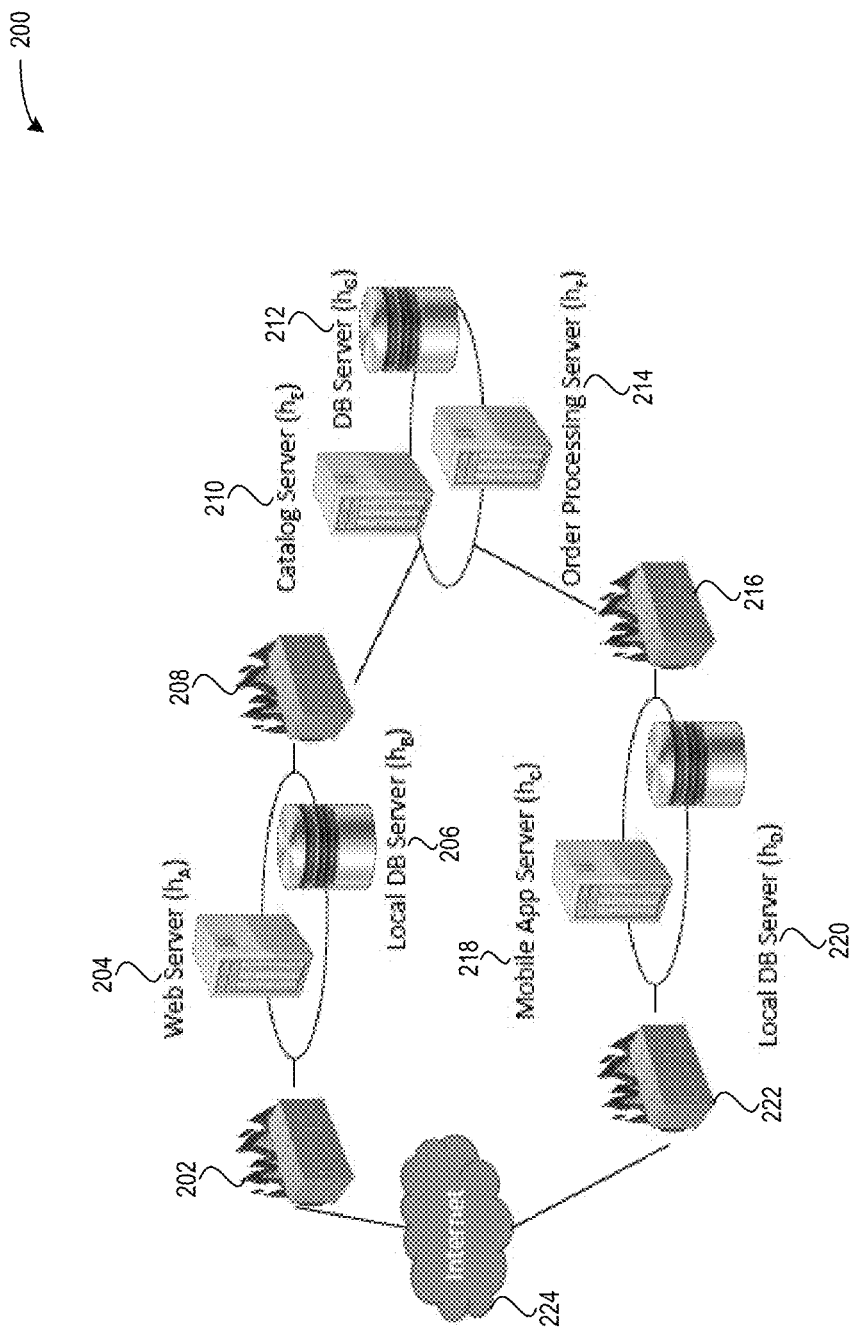
FIG. 2A illustrates an exemplary network diagram of an e-commerce system, in accordance with an embodiment of the present application.

FIG. 2A illustrates an exemplary network diagram 200 of an e-commerce system, in accordance with an embodiment of the present application. Diagram 200 can include clusters or groups of entities separated by firewalls and connected via a network 224 (e.g., the internet). For example, a first set of entities can include a Web Server 204 ($h_A$) and a Local Database Server 206 ($h_B$). The first set of entities can be separated by a firewall 208 from a second set of entities, which can include a Catalog Server 210 ($h_E$), a Database Server 212 ($h_G$), and an Order Processing Server 214 ($h_F$). The second set of entities can be separated by a firewall 216 from a third set of entities, which can include a Mobile Application Server 218 ($h_C$) and a Local Database Server 220 ($h_D$). The third set of entities can be separated by a firewall 222 from network or internet 224, and the first set of entities can be separated by a firewall 202 from network or internet 224. Entities in a same or different group may be dependent upon each other, as depicted below in relation to FIG. 2B.

Figure 2B:
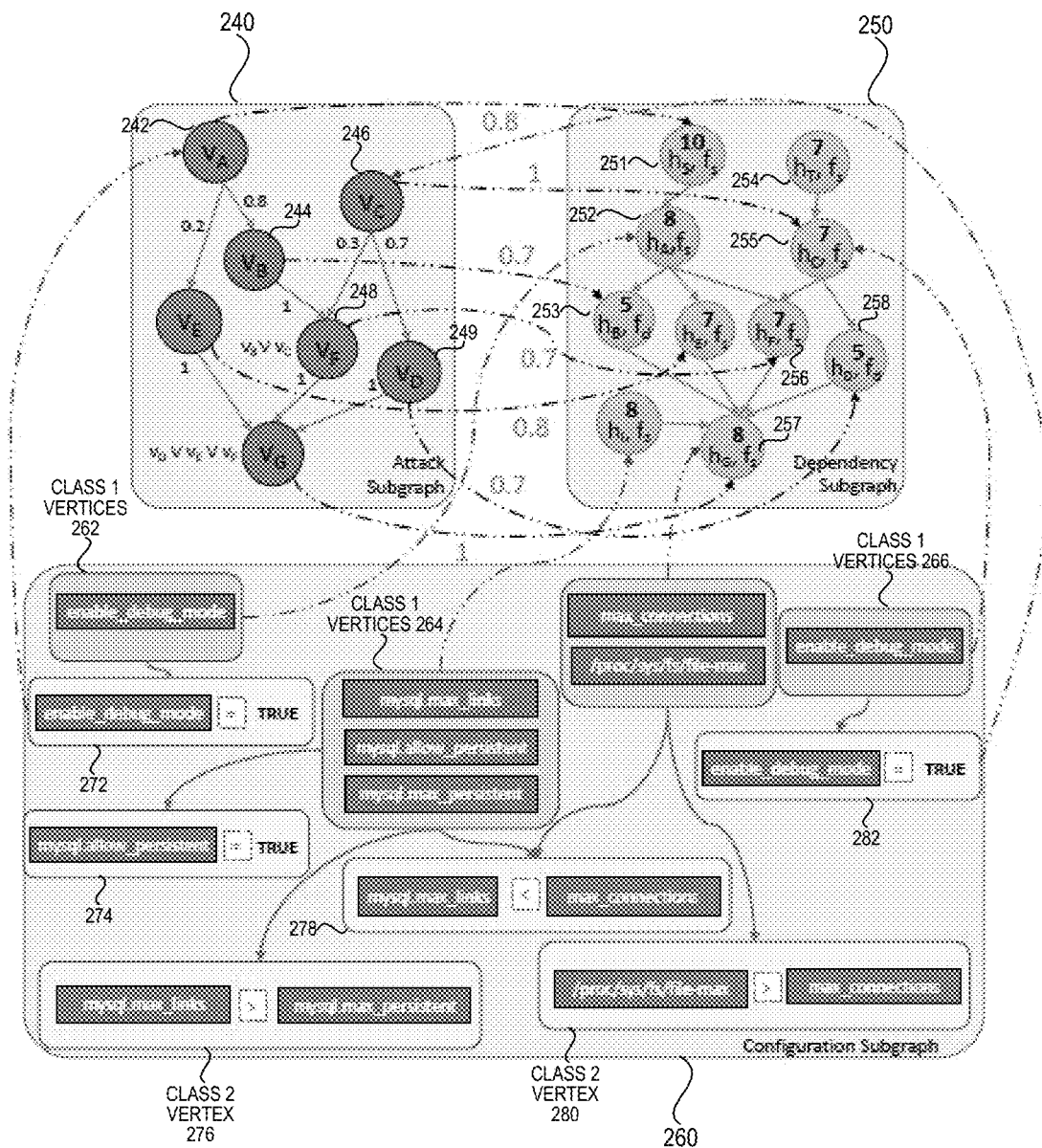
FIG. 2B illustrates an exemplary multi-layer graph corresponding to the network diagram of FIG. 2A, in accordance with an embodiment of the present application.

FIG. 2B illustrates an exemplary multi-layer graph 230 corresponding to the network diagram of FIG. 2, in accordance with an embodiment of the present application. Graph 230 can include an attack subgraph 240, a dependency subgraph 250, and a configuration subgraph 260.

As described above, modeling framework 104 of FIG. 1 can use the ingested data from data ingestion framework 102 to construct a three-layer directed graph that efficiently encodes the information needed for computing optimal configurations. A first layer can comprise a dependency subgraph, a second layer can comprise a configuration subgraph, and a third layer can comprise an attack subgraph. The edges between these three subgraphs can determine the functional composition and the attack surface for a configuration set, as described in detail below.

The dependency subgraph (subgraph 250) represents the functional dependencies between components of the target composed system. In this subgraph, each vertex represents a functional component of the system and carries a utility value. Each vertex also has a label identifying one of three dependency types, as described below. Each edge in the dependency subgraph represents a functional dependency on another component, as specified by the dependency label of the parent vertex.

The configuration subgraph (subgraph 260) represents relationships between configuration parameters, both within any system component and across different components of the composed system. There are two classes of vertices in the configuration subgraph: a first class of nodes or "Class 1" vertices capture per-component configuration parameters; and a second class of nodes or "Class 2" vertices capture relationships among (or conditions on) the configuration parameters. These relationships are specified by functional system requirements and admissibility of the configuration setting, as described below. Furthermore, some of the relationships between the configuration parameters enable or disable preconditions for system vulnerabilities, which can result in inducing a particular attack subgraph for that configuration. Similar to these relationships among configuration parameters, a particular parameter assignment can also create a precondition for a vulnerability which can be exploited, thus providing an entry point into the attack subgraph.

For example, configuration subgraph 260 can include Class 1 vertices 262, 264, and 266, where each group of Class 1 vertices is depicted in its own pink-colored box and corresponds to configuration parameters for a specific component depicted in dependency subgraph 250. Furthermore, configuration subgraph 260 can include Class 2 vertices 272, 274, 276, 278, 280, and 282, where each respective Class 2 vertex is depicted in its own beige-colored box and corresponds to a configuration constraint between configuration parameters (whether between configuration parameters within a same component or across different components), such as the configuration parameters indicated by Class 1 vertices 262-266.

The attack subgraph (subgraph 240) represents the propagation of potential multi-step attacks on components in the dependency graph for a particular configuration. In the attack subgraph, each vertex represents a vulnerability. An edge in the attack subgraph indicates that exploiting the parent vulnerability (a node at the start of a first green-colored arrow) can set the stage for the attacker to exploit the child vulnerability (a node at the end of the first green-colored arrow). Each edge is also labeled with a probability value, representing the probability of the attack progressing along that edge. The nodes and edges in attack subgraph 240 are described below.

Detailed Description of Modeling Framework

As described above, the overall system can model a distributed or composed system (such as an IoT composed system) as a multi-layer or a three-layer directed graph which encodes the information needed to reason upon the optimality of system configurations. The multi-layer graph can include: a dependency subgraph; a configuration subgraph; and a vulnerability or attack subgraph. Directed edges between nodes in each of the three subgraphs can define the functional composition and attack surface for a configuration set, as described below in relation to FIGS. 2B and 3.

—The Dependency Subgraph

Configuration changes in one component can have a dramatic impact on the security and functionality of other components. Globally optimal security decisions—e.g., deciding which vulnerabilities to make unreachable through configuration changes—may require dependency information. As a result, the embodiments described herein generate a dependency subgraph which explicitly models dependencies. Given the overall system, a useful set of dependencies may be derived by analyzing standard operating procedures or using known approaches.

A node in the dependency subgraph can represent a system component, where the system component can include, e.g., a software component, a hardware component, a middleware component, and a networking component. A directed edge between a first dependency subgraph node and a second dependency subgraph node can indicate a dependency between two respective components. Depending on the level of granularity of the model, a component may be a host or an individual service running on a host. By capturing dependencies at the lowest possible level of granularity, the dependency graph may be acyclic. Current approaches to discovering dependencies may generate graphs with cycles, but such cycles may indicate that the system has not been analyzed at a sufficient level of granularity, and can thus be broken by breaking macro-components into sub-components. Current approaches regarding call graphs may indicate how to identify dependencies at the level of individual procedure and function calls as well as how to construct acyclic graphs modeling such dependencies.

The modeling framework can capture a wide range of possible relationships between components of a system by modeling each dependency as a function from a family F of functions of the form $f:[0, 1]^n \rightarrow [0, 1]$, with $f(0, \ldots, 0)=0$ and $f(1, \ldots, 1)=1$. Each component can have a value (or utility) for the organization, and its dependency function defines its ability to deliver its expected value, based on the status of the components upon which it depends. The arguments of this function can be the percentage residual values of such components and may in turn be computed through the respective dependency function of each component. A dependency function can return a value of 1 when the component can deliver 100% of its value, and can return a value of 0 when the component has been completely compromised and cannot deliver any value.

The modeling framework can include three major categories or types of dependency relationships for a respective component: (i) redundancy ($f_r$), wherein the respective component depends on a redundant pool of resources; (ii) strict dependence ($f_s$), wherein the respective component strictly depends on a first pool of other components, and wherein if a single component of the first pool of other components fails, the respective dependent component no longer delivers value (e.g., fails to deliver any value); and (iii) graceful degradation ($f_d$), wherein the respective component depends on a second pool of other components, and wherein if a single component of the second pool of other components fails, the system continues to work or operate with a degraded performance. These classifications are not intended to be exhaustive; other dependency relationships may be introduced by defining the corresponding dependency functions, as shown below for the three categories (i)-(iii) listed above.

$$f_r(l_1, \ldots, l_n) = \begin{cases} 1, & \text{if } \exists i \in [1, n] \text{ s.t. } l_i = 1 \\ 0, & \text{otherwise} \end{cases} \quad \text{Equation (1)}$$

$$f_d(l_1, \ldots, l_n) = \frac{1}{n}\sum_{i=1}^{n} l_i \quad \text{Equation (2)}$$

$$f_s(l_1, \ldots, l_n) = \begin{cases} 1, & \text{if } \forall i \in [1, n], l_i = 1 \\ 0, & \text{otherwise} \end{cases} \quad \text{Equation (3)}$$

In dependency subgraph 250 of FIG. 2B, a directed edge from a first dependency node 252 ($h_A$) to a second dependency node 253 ($h_B$) indicates that the first dependency node depends on the second dependency node. That is, Web Server 204 (denoted as $h_A$) depends on Local Database Server 206 (denoted as $h_B$). Each dependency subgraph node in dependency subgraph 250 represents a specific component of the system, and each dependency subgraph node can be labeled with the type of dependency (i.e., redundancy, strict dependence, or graceful degradation) and a number representing a value associated with the specific component. For example, the first dependency subgraph node 252 (indicated or identified as $h_A$) is labeled with $f_s$ (which indicates a strict dependence category or type) and a value of 8. The second dependency subgraph node 254 (indicated or identified as $h_B$) is labeled with $f_d$ (which indicates a graceful degradation category or type) and a value of 5. Thus, because Web Server 204 depends on Local Database Server 206 based on a strict dependence type, if Local Database Server 206 fails, then Web Server 204 can no longer deliver value (e.g., cannot function properly). Furthermore, because Local Database Server 206 depends on Database Server 212 (denoted as $h_G$) based on a graceful degradation dependence type, if Database Server 212 fails, then Local Database Server 206 may continue to operate with a degraded performance.

The values labeled on and corresponding to each dependency subgraph node may be assigned by a domain expert, or may be automatically derived by computing graph-theoretic centrality metrics, which can indicate how important (or central) each node is for the operation of a system or mission. As an example, in the field of security, ad-hoc centrality measures may be used for botnet detection and mitigation.

—The Configuration Subgraph

In the configuration subgraph, the modeling framework can model relationships between configuration parameters, both within a component and across different components of the composed system. As described above, the modeling framework can generate nodes or vertices of two different classes: Class 1 vertices, which represent per-component configuration parameters; and Class 2 vertices, which capture constraints on one or more configuration parameters (e.g., by encoding value assignments for configuration parameters and relationships between configuration parameters). Edges from one or more Class 1 vertices to a Class 2 vertex can identify the parameters involved in a constraint. Some of these constraints may be specified in the documentation for the component or the composed system.

Some of the relationships between configuration parameters may enable or disable preconditions for vulnerabilities in one or more components. The modeling framework captures this information by including directed edges from Class 2 vertices of the configuration subgraph to relevant nodes in the vulnerability subgraph. The constraints associated with a given system configuration can induce a specific vulnerability subgraph for the composed system. For example, in FIG. 2B, in Class 2 vertex 272, the constraint 272 of "enable_debug_mode=TRUE" indicates a value assignment for the configuration parameter. This constraint must be satisfied when the system is in debug mode, and can create the preconditions to exploit vulnerability $V_A$ 242 (as indicated by the red-colored dash/dotted arrow of the directed edge from Class 2 configuration subgraph node 272 to vulnerability subgraph node 242 (denoted as $V_A$), thus providing an entry point into attack subgraph 240.

The degree to which configuration parameter dependencies, within and across components, can be captured can depend on the complexity of the components themselves and the completeness of their documentation, including the set of standard operating procedures adopted by an organization. The overall system can extract configuration information in a variety of forms, as described in U.S. Pat. No. 11,729,222.

—The Vulnerability Subgraph

Vulnerability subgraphs (or attack graphs) can be powerful conceptual tools to represent knowledge about vulnerabilities and their dependencies. To assess the impact of configuration changes on the attack surface of a system, the modeling framework uses a compact representation of attack graphs. Each node or vertex in the vulnerability subgraph can represent each exploit or security condition, which can lead to an acyclic attack graph of polynomial size in the total number of vulnerabilities and security conditions.

For example, in vulnerability subgraph 240 of FIG. 2B, nodes or vertices can represent known vulnerabilities. A directed edge from a first vulnerability subgraph node 242 (denoted as $V_A$) to a second vulnerability subgraph node 244 (denoted as $V_B$) can indicate that exploiting $V_A$ creates the preconditions for exploiting $V_B$. In addition, vulnerability subgraph 240 can be generated by combining information from network scanners (e.g., Nessus7) and vulnerability databases (e.g., Common Vulnerability and Exposure (CVE) entries from the NVD).

Conventional approaches to minimizing the attack surface may be directed to minimizing, for instance, the number of exploitable resources available to an adversary. In contrast, in the embodiments described herein, the modeling framework can analyze the paths that an adversary can traverse in a multi-step attack that seeks to achieve a well-defined goal (e.g., compromising a series of devices that lead up to a database and then exfiltrating sensitive information from that database). The modeling framework can subsequently evaluate the impact resulting from such attacks.

The directed edges in vulnerability subgraph 240 of FIG. 2B are labeled with probability values, which can be used to infer the most likely paths that an attacker might take in a multi-step attack. Determining the probability values can be based on a variety of factors and heuristics. That is, the likelihood that an attacker will exploit a given vulnerability can be derived from, e.g.: (i) the skill level of the attacker relative to the complexity of the exploit; (ii) the resources and time available to the adversary; and (iii) other metrics defined in or determined based on the Common Vulnerability Scoring System (CVSS). One rationale is that vulnerabilities that require more resources, time, and skill are less likely to be exploited. For example, CVSS defines the Access Complexity (AC) of a vulnerability as a measure of the intricacy of the attack required to exploit that vulnerability once an attacker has gained access to the target system. The modeling framework can use these probabilities to determine the security impact of a given configuration.

Edges Across Subgraphs; Exemplary Node Relationships and Graphical Display

In addition to the edges within subgraphs, the overall system and the constructed multi-layer graph can include edges across the three subgraphs, e.g., edges between nodes in different subgraphs or directed edges from a node in one subgraph to a node in another subgraph. That is, in the constructed multi-layer model, the three subgraphs can be connected to each other with three types of edges:

(1) Edges from the dependency subgraph to the configuration subgraph: An edge between a component in the dependency subgraph and a Class 1 vertex in the configuration subgraph represents the list of configuration parameters associated with that component. There are no edges between the dependency subgraph and Class 2 vertices in the configuration subgraph.

(2) Edges from the configuration subgraph to the vulnerability subgraph: An edge between a Class 2 node in the configuration subgraph and a vertex in the attack subgraph (i.e., a vulnerability) implies that the relationship expressed in the Class 2 vertex satisfies a precondition for that vulnerability.

(3) Edges from the vulnerability subgraph to the dependency subgraph: An edge between a vertex in the attack subgraph (i.e., a vulnerability) and a vertex in the dependency subgraph (i.e., a system component) represents the amount of degradation (i.e., exposure factor) of the component due to exploitation of the vulnerability and ranges from 0 to 1.

Thus, the modeling framework can store relationships between system components, configuration parameters, configuration predicates, and vulnerabilities in a queryable, graph-based form. The modeling framework can also provide an application programming interface (API) to quantitatively evaluate the security of different system configurations using topological vulnerability analysis (e.g., by assessing and calculating the impact of one or more attack paths). The modeling framework can be built using a graph database platform, such as Neo4j, and the modeling framework can convert all ingested information into a graphical format. The modeling framework APIs which provide security evaluation and configuration impact analysis may be implemented as a Neo4j plug-in, which can: analyze attack scenarios (i.e., finite sequences of vulnerabilities that can be exploited by an attacker); (ii) compute various attack surface metrics; and (iii) assess the security impact of configuration changes, as described below.

Figure 3:
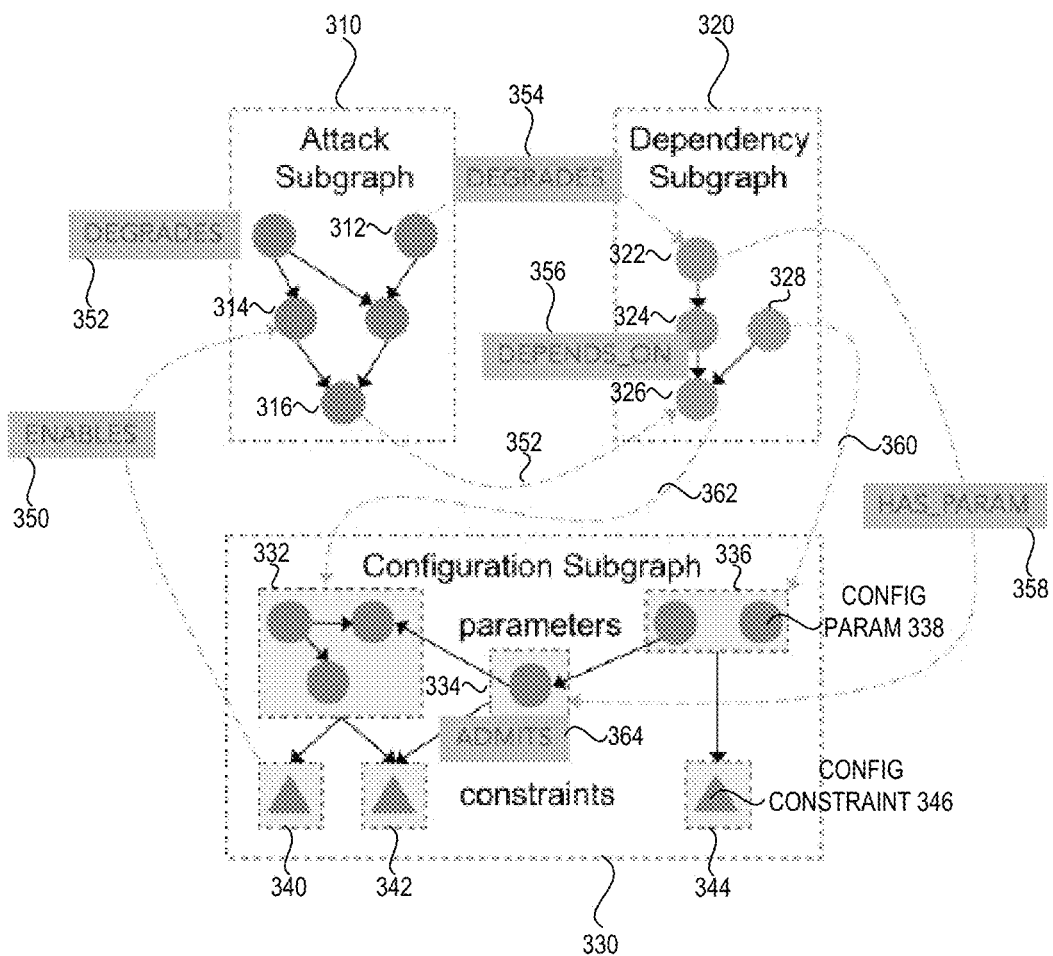
FIG. 3 illustrates an exemplary high-level diagram of a multi-layer graph, including semantics of the relationships among subgraphs, in accordance with an embodiment of the present application.

FIG. 3 illustrates an exemplary high-level diagram 300 of a multi-layer graph, including semantics of the relationships among subgraphs, in accordance with an embodiment of the present application. Diagram 300 can include: an attack subgraph 310, with each vulnerability node depicted as a red-colored circle, and relationships between vulnerability nodes depicted as black arrows; a dependency subgraph 320, with each component node depicted as a blue-colored circle, and relationships between component nodes depicted as black arrows; and a configuration subgraph 330, with configuration parameters depicted as green-colored circles and configuration constraints depicted as green-colored triangles.

Configuration subgraph 330 can include two types of nodes or vertices, as described above in relation to FIG. 2B. "Class 1" vertices capture per-component configuration parameters, e.g., the green-colored circles in boxes 332, 334, and 336. For example, box 336 includes a configuration parameter 338, which is a Class 1 vertex. "Class 2" vertices capture relationships among (or conditions on) the configuration parameters, e.g., the green-colored triangles in boxes 340, 342, and 344. For example, box 344 includes a configuration constraint 346, which is a Class 2 vertex.

In configuration subgraph 330, relationships within and across components are depicted as black arrows between the green-colored circles, while constraints between and among the components are depicted as black arrows between the Class 1 vertices and the Class 2 vertices.

Furthermore, configuration subgraph 330 indicates several semantics regarding the relationships of the nodes within each subgraph as well as the relationships of the nodes across subgraphs, e.g., via directed edges. For example, a configuration constraint 340 enables (350, indicated by a purple dashed arrow) a vulnerability 314. A vulnerability 316 degrades (352, indicated by a purple dashed arrow) or represents the exposure factor of the component indicated by a dependency subgraph node 326 based on the exploitation of vulnerability 316. Similarly, a vulnerability 312 degrades (354, indicated by a purple dashed arrow) or represents the exposure factor of the component indicated by a dependency subgraph node 322 based on the exploitation of vulnerability 312.

In addition, dependency subgraph node 324 depends on (356, indicated with a black arrow) dependency subgraph node 326. Dependency subgraph node 322 is associated with or has parameters (358, indicated by a purple dashed line) indicated in a node of Class 1 vertices 334 (e.g., configuration parameters associated with the component represented by dependency subgraph node 322). Similarly, dependency subgraph node 328 is associated with or has parameters (360, indicated by a purple dashed line) indicated in a node of Class 1 vertices 336 (e.g., configuration parameters 338 associated with the component represented by dependency subgraph node 328). Similarly, dependency subgraph node 326 is associated with or has parameters (362, indicated by a purple dashed line) indicated in a node of Class 1 vertices 332 (e.g., configuration parameters associated with the component represented by dependency subgraph node 326).

Moreover, a configuration subgraph node of Class 1 vertex 334 identifies or admits (364, indicated with a black arrow) the relationship of the configuration parameters involved in the configuration constraint of Class 2 vertex 342.

Figure 4:
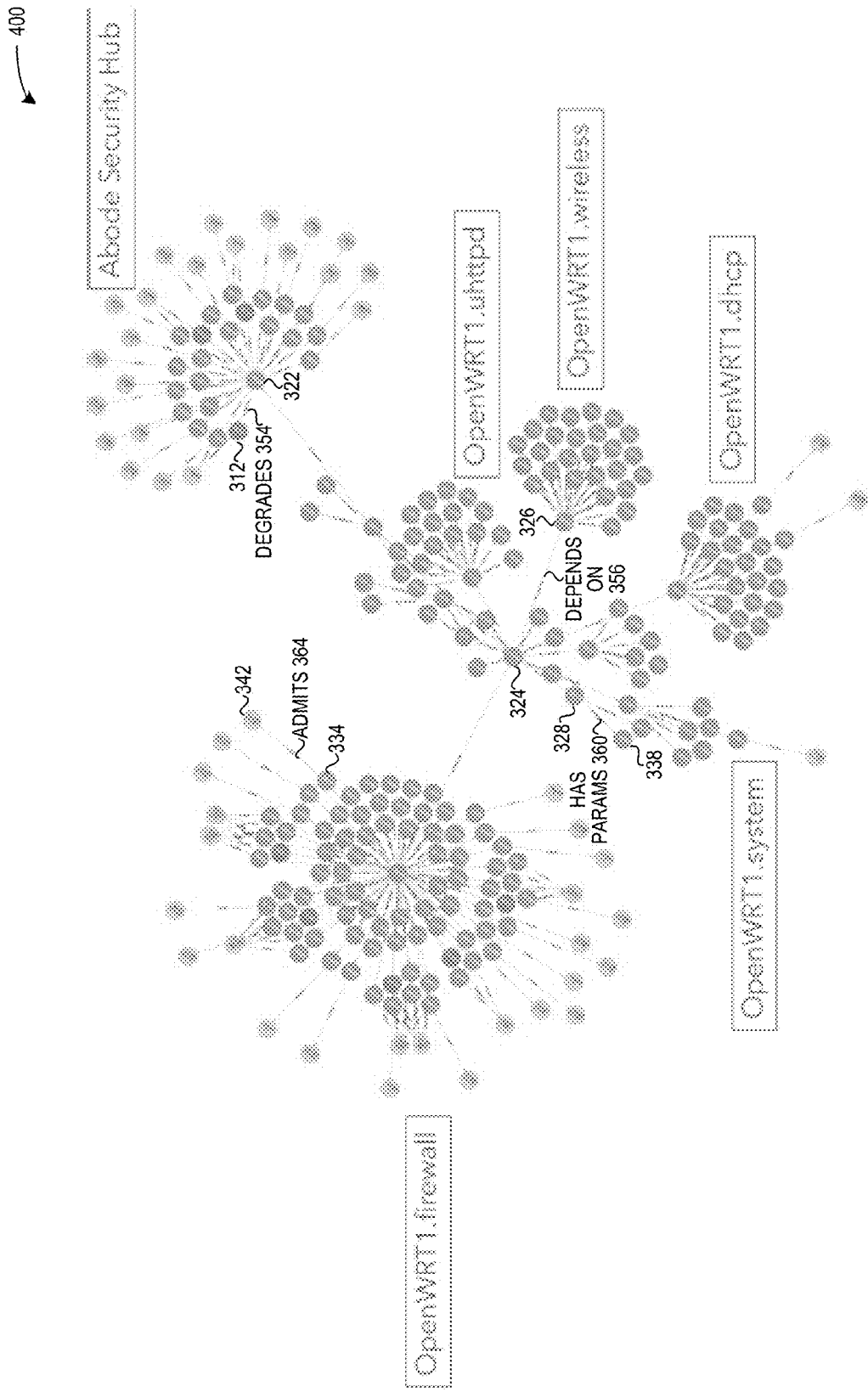
FIG. 4 illustrates an exemplary graphical display of a multi-layer graph, in accordance with an embodiment of the present application.

FIG. 4 illustrates an exemplary graphical display 400 of a multi-layer graph, in accordance with an embodiment of the present application. Graphical display 400 can include part of a multi-layer graph corresponding to sample testbed data. In graphical display 400, the red circles correspond to nodes in the vulnerability subgraph, the blue circles corresponds to nodes in the dependency subgraph, the green circles correspond to a first class of nodes (configuration parameters) in the configuration subgraph, and the yellow circles correspond to a second class of nodes (configuration constraints) in the configuration subgraph.

A directed edge from a red vulnerability subgraph node to a blue dependency subgraph node indicates that the vulnerability subgraph node degrades or causes a degradation of the dependency subgraph node. For example, vulnerability subgraph node 312 degrades (354) or represents the exposure factor of the component indicated by dependency subgraph node 322 based on the exploitation of vulnerability 312. A directed edge from a first dependency subgraph node to a second dependency subgraph node indicates that the first dependency subgraph node depends on the second dependency subgraph node. For example, dependency subgraph node 324 depends on (356) dependency subgraph node 326.

A directed edge from a dependency subgraph node to a configuration subgraph node of the first class (i.e., a configuration parameter) indicates that the dependency subgraph node is associated with or has parameters indicated by the configuration subgraph node of the first class. For example, dependency subgraph node 328 is associated with or has parameters (360) indicated in node 338. Furthermore, a directed edge from a Class 1 configuration subgraph node (i.e., a configuration parameter) to Class 2 configuration subgraph node (i.e., a configuration constraint) indicates that the Class 1 node identifies or admits the configuration parameters involved in the configuration constraint. For example, Class 1 configuration subgraph node 334 identifies or admits (364) the relationship of the configuration parameters involved in Class 2 configuration subgraph node 342.

Note that high-level diagram 300 of FIG. 3 may not correspond directly to exemplary graphical display 400 of FIG. 4. The use of the same numbers to identify nodes in the three subgraphs as well as directed edges within and between nodes in the three subgraphs is provided to demonstrate each node, pair of nodes, or relationship between nodes as directed edges. The exemplary nodes and relationships described in relation to the partial multi-layer graph of FIG. 4 are intended to provide a larger view of a displayed multi-layer graph. The text associated with each colored node and directed edge need not be clearly visible for purposes of illustrating the displayed multi-layer graph.

Assessing or Calculating the Impact of Multi-Step Attacks

The modeling framework can compute the impact on a distributed system of multi-step attacks that are enabled under a given system configuration. In FIG. 2B, assume that an attacker exploits vulnerability 246 (denoted as $V_C$). This exploitation renders the component represented by dependency subgraph node 255 (denoted as $h_C$) completely unavailable, because the exposure factor $h_C$ with respect to $h_C$ is 1. Since dependency subgraph node 254 (denoted as $h_T$) strictly depends on node 258, node 259 also becomes unavailable. This can lead to a marginal impact of 7+7=14 (i.e., the sum of the values associated with dependency subgraph nodes 258 and 259 which become completely unavailable based on the exploitation of vulnerability 246). Based on this, the modeling framework can define the impact function for a single attack step as:

$$\text{impact}(v_j) = \sum_{h \in H} (s_{j-1}(h) - s_j(h)) \cdot u(h), \quad \text{Equation (4)}$$

where $s_{j-1}(h)$ and $s_j(h)$ respectively denote the relative residual utility of component h before and after exploitation of $v_j$ in an attack path $P=(v_1, \ldots, v_n)$, and u (h) is the original utility of h. For a given attack step $v_j$, this impact function can add up the marginal losses for all the components affected (either directly or indirectly) by the exploitation of $v_j$. Therefore, the impact of exploiting $v_j$ depends on what other vulnerabilities were exploited in previous attack steps and how they impacted the system. Furthermore, in a multi-step attack, the utility of each component may further decrease after each attack step. In practice, s (h) can be defined as follows:

$$s_i(h) = \begin{cases} 1, & \text{if } i = 0 \\ f_b(s_i(h_1), \ldots, s_i(h_n)), & \text{otherwise} \end{cases} \quad \text{Equation (5)}$$

where $f_h$ is the dependency function associated with component h, and where $h_1, \ldots, h_n$ are the components upon which h depends.

The constructed multi-layer graph model can provide non-obvious insights about security optimization. For instance, after exploiting vulnerability 246 (denoted as $V_C$), the attacker may take one of two steps: exploiting vulnerability subgraph node 249 (denoted as $V_D$) with probability 0.7; or exploiting vulnerability subgraph node 248 (denoted as $V_F$) with probability 0.3. Intuition may suggest that because exploiting $V_D$ has a higher probability value than exploiting $V_F$, that the attacker would be more likely to exploit $V_D$, and consequently, that vulnerability $V_D$ should be patched or addressed before vulnerability $V_F$.

However, this approach results in an inefficient operation for the attacker. The additional impact of exploiting vulnerability $V_D$ would be 0.7×5=3.5, (where 0.7 is the exposure factor on component $h_D$ of exploiting $V_D$ and 5 is the assigned value for component hD), as $h_C$ and $h_T$ are already unavailable because of the previous exploit. In comparison, the additional impact of exploiting $V_F$ would be 0.7×7+8+10=22.9, as compromising dependency subgraph node 256 (denoted as $h_F$) also makes unavailable both dependency subgraph node 252 (denoted as $h_A$ with an assigned value of 8) and dependency subgraph node 251 (denoted as $h_S$ with an assigned value of 10). This suggests that, even though the attacker is more likely to exploit $V_D$, the security benefit of addressing $V_F$ may be greater. Quantitatively, the impact of an adversary sequentially exploiting $v_1, \ldots, v_n$ in an attack path $P=(v_1, \ldots, v_n)$ in the vulnerability subgraph is:

$$\text{impact}(P) = \sum_{j=1}^{n} \sum_{h \in H} (s_{j-1}(h) - s_j(h)) \cdot u(h) \quad \text{Equation (6)}$$

In this analysis, it can be important to compare attack paths and prioritize countermeasures. The goal of the modeling framework and the overall SCIBORG system is to identify configuration changes that minimize the attack surface of the system, by blocking high-impact attack paths. To achieve this goal, the modeling framework can define attack surface metrics that consider the likelihood and potential impact of each attack path, rather than simply counting the vulnerable entry points. A simple yet effective metric is:

$$\text{attack\_surface}(S) = \sum_{i=1}^{m} \text{impact}(P_i) \cdot Pr(Pi) \quad \text{Equation (7)}$$

where $P_1, \ldots, P_m$ are known attack paths, impact $(P_i)$ is the impact of $P_i$ and $Pr(P_i)$ is the likelihood of $P_i$.

The impact calculation performed by the overall system and the modeling framework can be extended to assess the impact of multiple attacks executed concurrently. The worst-case scenario is one in which, at each step, the attacker exploits, with probability 1, all vulnerabilities for which preconditions are satisfied. If $\{V_1, \ldots, V_m\}$ is a topological sort of all the nodes in the attack graph, then the attack surface metric can be defined as:

$$\text{attack\_surface}(S) = \sum_{j=1}^{m} \sum_{h \in H} (s_{j-1}(h) - s_j(h)) \cdot u(h) \quad \text{Equation (8)}$$

Thus, Equation (8) can define the attack surface as the potential impact of a multi-step attack in which all attack paths are pursued concurrently. While this may not be realistic in practice, this scenario can provide an upper bound on the susceptibility of a system to attacks. A more practical or realistic worst-case scenario may consider the relative complexity of exploiting different vulnerabilities, providing a trade-off between the two scenarios of Equations (7) and (8). However, intuition may suggest that minimizing the attack surface as defined by Equation (7) would—at least sub-optimally—minimize any other reasonable attack surface metrics.

Exemplary Environment for Constructing a Multi-Layer Graph

Figure 5:
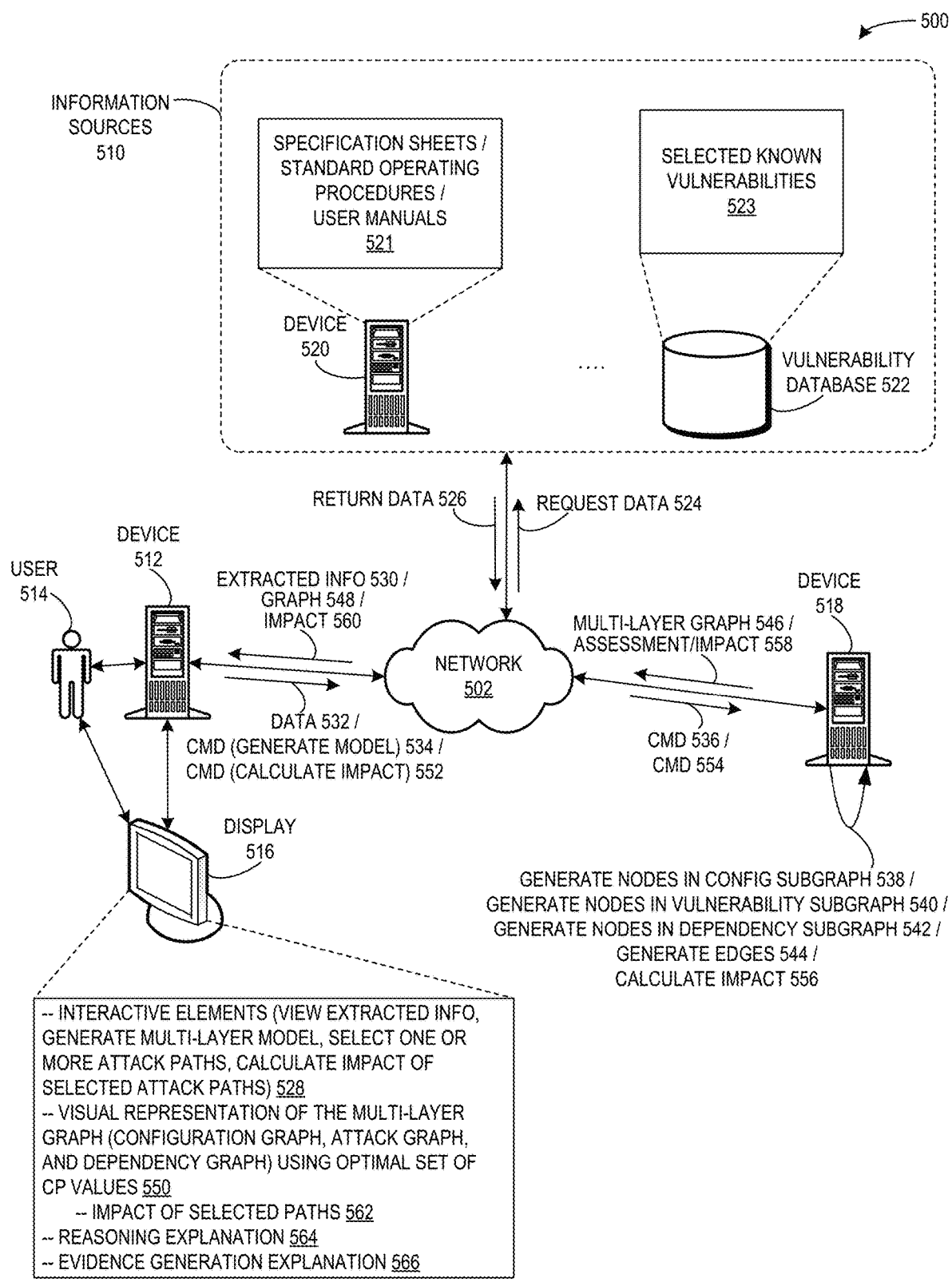
FIG. 5 depicts an exemplary environment for constructing a graph-based model for optimizing the security posture of a composed IoT system, in accordance with an embodiment of the present application.

FIG. 5 depicts an exemplary environment 500 for constructing a graph-based model for optimizing the security posture of a composed IoT system, in accordance with an embodiment of the present application. Environment 500 can include: a device 512, an associated user 514, and an associated display 516; information sources 510; and a device 518. Information sources 510 can include a plurality of devices and data stored in the plurality of devices, e.g., a device 520 (which can include an associated storage device, not shown) and a vulnerability database 522 (e.g., NVD). Information sources 510 can also include IoT search engines, such as Shodan (not shown) and other public or proprietary databases. Devices 512 and 518 can communicate with each other and with devices associated with information sources 510 (e.g., device 520 and vulnerability database 522) via a network 502. Device 520 can store, obtain, or access, e.g., specification sheets/standard operating procedures/user manuals 521. Vulnerability database 522 can include vulnerabilities which are organized based on a category of vulnerability, and can also include selected known vulnerabilities 523. Device 518 can be a server, a computing device, or any device which can perform the functions described herein.

During operation, device 512 can receive information obtained from information sources 510 and ingested by device 518 (e.g., by the data ingestion framework or another device or component). As described in U.S. Pat. No. 11,729,222, device 518 can determine information sources from which to retrieve data, request the data from the information sources (via a request data 524 communication), and receive the requested data (via a return data 526 communication). Upon receiving the requested data, device 518 can ingest the data, normalize the ingested data, and extract information from the ingested data. Device 518 can return the extracted information (as extracted information 530) to, e.g., a requesting host or client or user.

Device 512 can receive extracted information 530, and can display on the screen of display 516 interactive elements 528 (which allow user 514 to, e.g., view the extracted information and generate the multi-layer module). User 514 can select an interactive element on display 516, which corresponds to a command to generate the multi-layer module. For example, user 514 can send a command 534 (to generate the multi-layer model) along with data 532 (i.e., extracted information 530) to device 518 via network 502. Device 518 can receive command 534 (as a command 536), and generate a multi-layer graph by performing the following operations: generate nodes in the configuration subgraph 538; generate nodes in the vulnerability subgraph 540; generate nodes in the dependency subgraph 542; and generate edges 544 (including directed edges between nodes in a same subgraph and between nodes in different subgraphs). Device 518 can return a multi-layer graph 546 back to device 512.

Device 512 can receive graph 546 (as a graph 548), and can display on the screen of display 516 at least: interactive elements 528 (which allow the user to, e.g., select one or more attack paths and calculate an impact of the selected attack paths); a visual representation of the multi-layer graph (configuration graph, attack graph, and dependency graph) using an optimal set of configuration parameter values 550; an impact of the selected paths 562; a reasoning explanation 564; and an evidence generation explanation 566.

User 514 can select an interactive element on display 516, which corresponds to selecting one or more attack paths, and user 514 can further send a command to calculate the impact of the selected attack paths. For example, user 514 can send a command 552 (to calculate the impact of selected attack paths) to device 518 via network 502. Device 518 can receive command 552 (as a command 554), and calculate the impact of the selected attack paths (via a calculate impact 556 operation). Device 518 can return an assessment/impact 558 back to device 512.

Device 512 can receive impact 558 (as an impact 560), and can display on the screen of display 516 at least: interactive elements 528 (which allow the user to, e.g., select one or more attack paths and calculate an impact of the selected attack paths); a visual representation of the multi-layer graph (configuration graph, attack graph, and dependency graph) using an optimal set of configuration parameter values 550; an impact of the selected paths 562; a reasoning explanation 564; and an evidence generation explanation 566.

User 514 can continue to receive extracted information, view the extracted information, send commands to generate the multi-layer model for display, view the generated multi-layer graph, select one or more attack paths, send commands to assess an impact of the selected attack paths, and view the calculated assessment or impact of the selected attack paths.

Thus, environment 500 depicts the modeling framework, which includes generating the multi-layer model based on data ingested and extracted from multiple sources and calculating the impact of selected attack path. The modeling framework can output both the multi-layer graph and the calculated impact of selected attack paths, which can be passed downstream to the reasoning framework. In outputting the multi-layer graph and the security impact to the reasoning framework, the system can also output a setting which indicates a priority of either functionality or security. The setting can be set by a user or configured by the system or set at a default value, and can be subsequently passed downstream to the reasoning framework. The setting can also be a weighted value which indicates a ratio or percentage of the relative importance of functionality versus security for the overall system, or one or more components of the system (e.g., as a plurality, group, or set of components).

Figure 6A:
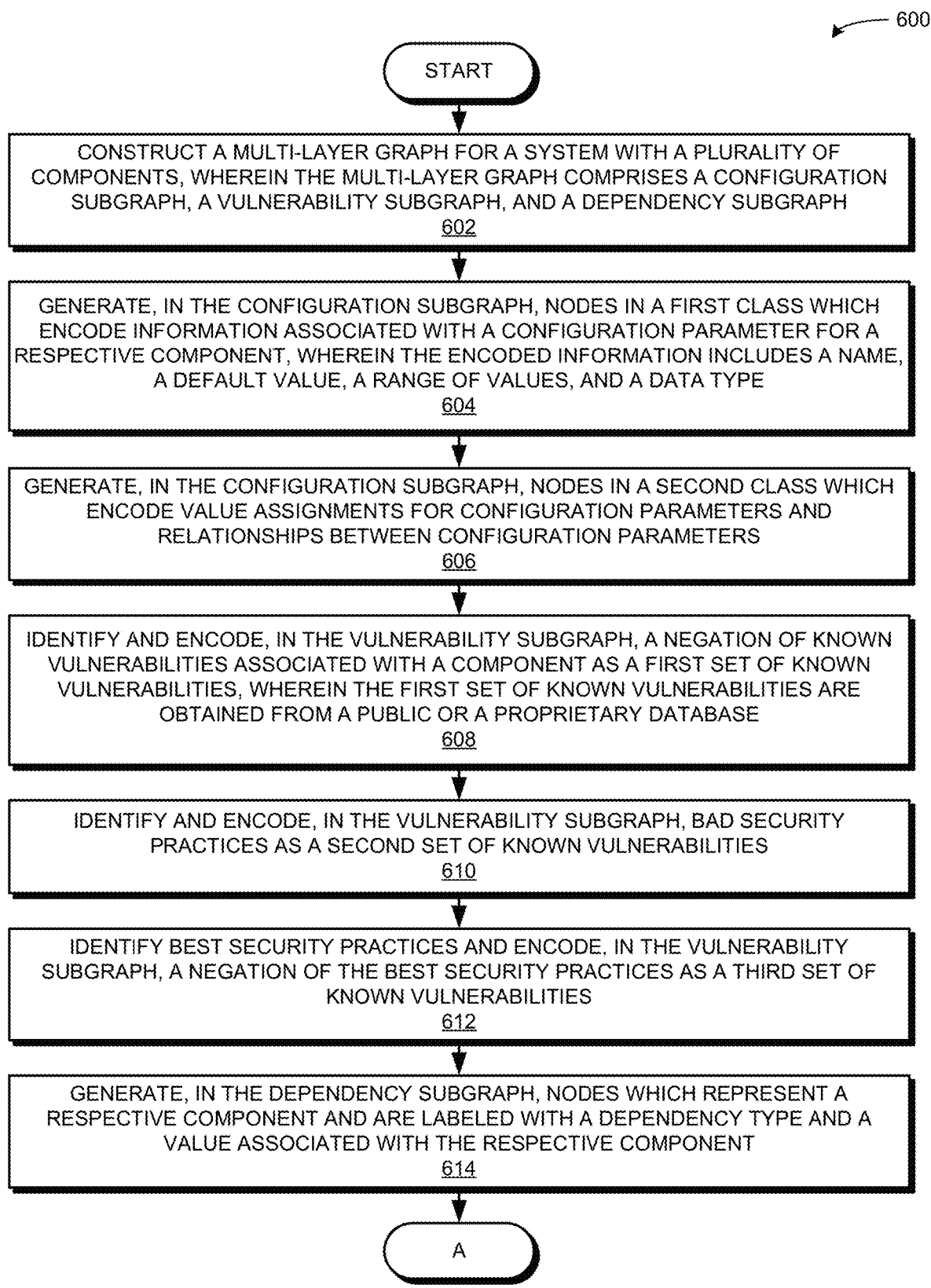
FIG. 6A presents a flow chart illustrating a method for constructing a graph-based model for optimizing the security posture of a composed IoT system, in accordance with an embodiment of the present application.

Exemplary Method for Extracting Configuration-Related Information for Reasoning about Security and Functionality of a Composed System FIG. 6A presents a flow chart 600 illustrating a method for constructing a graph-based model for optimizing the security posture of a composed IoT system, in accordance with an embodiment of the present application. During operation, the system constructs a multi-layer graph for a system with a plurality of components, wherein the multi-layer graph comprises a configuration subgraph, a vulnerability subgraph, and a dependency subgraph (operation 602). A component can include one or more of: a software component; a hardware component; a middleware component; and a networking component. The system generates, in the configuration subgraph, nodes in a first class which encode information associated with a configuration parameter for a respective component, wherein the encoded information includes a name, a default value, a range of values, and a data type (operation 604). The system generates, in the configuration subgraph, nodes in a second class which encode value assignments for configuration parameters and relationships between configuration parameters (operation 606). The relationships can be between configuration parameters of a same component, and between configuration parameters across different components.

The system identifies and encodes, in the vulnerability subgraph, a negation of known vulnerabilities associated with a component as a first set of known vulnerabilities, wherein the first set of known vulnerabilities are obtained from a public or a proprietary database (operation 608) (e.g., NVD, Shodan, scanners, etc.). The system identifies and encodes, in the vulnerability subgraph, bad security practices as a second set of known vulnerabilities (operation 610). The system identifies best security practices and encodes, in the vulnerability subgraph, a negation of the best security practices as a third set of known vulnerabilities (operation 612). The system generates, in the dependency subgraph, nodes which represent a respective component and are labeled with a dependency type and a value associated with the respective component (operation 614). The operation continues at Label A of FIG. 6B.

Figure 6B:
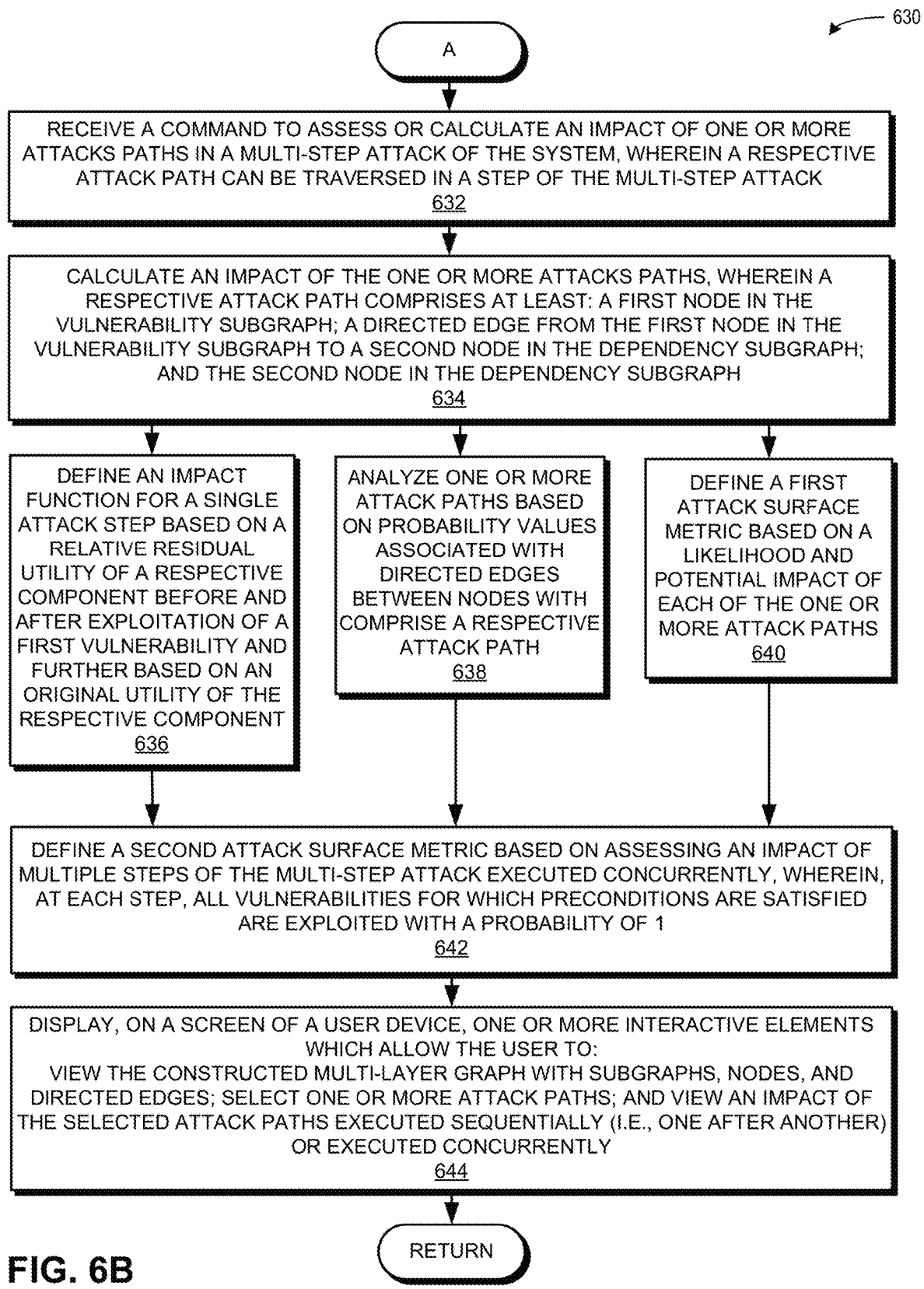
FIG. 6B presents a flow chart illustrating a method for constructing a graph-based model for optimizing the security posture of a composed IoT system, in accordance with an embodiment of the present application.

FIG. 6B presents a flow chart illustrating a method for constructing a graph-based model for optimizing the security posture of a composed IoT system, in accordance with an embodiment of the present application. During operation, the system receives a command to assess or calculate an impact of one or more attack paths in a multi-step attack of the system, wherein a respective attack path can be traversed in a step of the multi-step attack (operation 632). The system calculates an impact of the one or more attack paths, wherein a respective attack path comprises at least: a first node in the vulnerability subgraph; a directed edge from the first node in the vulnerability subgraph to a second node in the dependency subgraph; and the second node in the dependency subgraph (operation 634). The system can calculate the impact of the attack paths based on one or more of operations 636, 638, 640, and 642. That is, the system can define an impact function for a single attack step based on a relative residual utility of a respective component before and after exploitation of a first vulnerability and further based on an original utility of the respective component (operation 636). The impact of the exploitation of the first vulnerability is based on other vulnerabilities exploited in prior attack steps and the corresponding impact on the system, and, in the multiple-step attack, a utility of each component of the system decreases after each attack step.

The system can analyze one or more attack paths based on probability values associated with directed edges between nodes which comprise a respective attack path (operation 638). The system can define a first attack surface metric based on a likelihood and a potential impact of each of a plurality of attack paths, wherein a respective attack path can be traversed in a step of the multiple-step attack of the system (operation 640). The system can define a second attack surface metric based on assessing an impact of multiple steps of a multiple-step attack executed concurrently, wherein, at each step, all vulnerabilities for which preconditions are satisfied are exploited with a probability of one (operation 642).

Subsequently, the system can display, on a screen of a user device, one or more interactive elements which allow the user to: view the constructed multi-layer graph with subgraphs nodes, and directed edges; select one or more attack paths; and view an impact of the one or more attack paths executed sequentially (i.e., one after another) or executed concurrently (operation 644). The displayed multi-layer graph can include: the configuration subgraph and the generated configuration subgraph nodes; the vulnerability subgraph and the generated vulnerability subgraph nodes; the dependency subgraph and generated dependency subgraph nodes; and directed edges between nodes in a same subgraph or between nodes in different subgraphs.

No Known Approaches for the Described Functions/Embodiments; Improvements to Functioning of Computer; Improvements to Technical Fields There are currently no known systems or approaches for achieving or performing the above-described functions or embodiments. While current approaches may provide information about security vulnerabilities present in the configurations of individual components of a composed system, there is currently no known system or approach which provides a way to optimize the configuration so as to improve the overall security/functionality balance of the entire system. Specifically, there is currently no established way to extract configuration parameter values and normalize them for ingestion into the configuration graph. Furthermore, there are currently no known principled approaches to extract and define constraint relationships between configuration parameters of the same device, or of different devices, and to expose these relationships to an optimization algorithm.

The embodiments described herein of the modeling framework provide a system which constructs a multi-layer graph (comprising a configuration subgraph, a dependency subgraph, and a vulnerability subgraph), by generating nodes in each subgraph and directed edges both within each subgraph and across different subgraphs. The modeling framework also provides a graphical user interface associated with a user device. The graphical user interface may include one or more interactive elements or widgets, which allow a user to generate the multi-layer graph based on data output from the data ingestion framework (i.e., the extracted information from various information sources). The user may also select one or more attack paths, and send a command to the modeling framework to assess or calculate the impact of the selected attack paths, as described herein. The modeling framework can further return and display the calculated impact on the graphical user interface or display screen of the user device.

Given a composed system (such as an IoT system), the embodiments described herein can optimize the configuration of the system components by leveraging the complex relationships among the configuration parameters of the individual system components, which can result in improving the overall security and functionality balance of the entire system. Furthermore, the embodiments described herein provide an improvement over the existing state of the art in the computer technology field of providing security for a system of networked components, and also for optimizing the provided security.

The disclosed system includes a system of networked components (e.g., a composed system which is an IoT system), where each component may be a computing device with different configuration parameters and which may interact differently with the other networked components (or computing devices). Each component may also have different security and functionality parameters. The disclosed system is thus directed to a solution which is both necessarily rooted in computer technology and provides a specific implementation of a solution to a problem in the software arts. Furthermore, the disclosed system can enhance the functioning of the computer system itself, because optimizing the configuration of the system components can improve the balance between the security and the functionality of the overall composed system, which necessarily enhances the functioning of each individual networked component in the overall system. By providing a more secure system which is less prone to attack, the described embodiments can thus enhance the functioning of the computer system itself (as well as the networked components of the composed system), in terms of security, performance, and efficiency.

Furthermore, the described embodiments may be integrated into many different practical applications, e.g., used in many technical fields and for many different applications. Some exemplary systems include: a home IoT security system; a smart grid and microgrid security system; security relating to Navy ships, military aircraft, and Department of Defense (DoD) systems; security of networked critical infrastructure, such as dams, hospitals, and transportation networks; and enterprise security for networks of computers, printers, and mobile devices. Examples of primary users include: operators of DoD systems; operators and system administrators of distributed system and enterprise networks; security and information technology (IT) administrators for medium-to-large enterprises; and any users of the above listed exemplary systems.

Thus, the improvements provide by the disclosed system apply to several technologies and technical fields, including but not limited to: security of networked components; configuration security; cyber-physical system security; balancing security and functionality of networked components in an IoT system; and machine data analytics.

Exemplary Distributed Computer System

Figure 7:
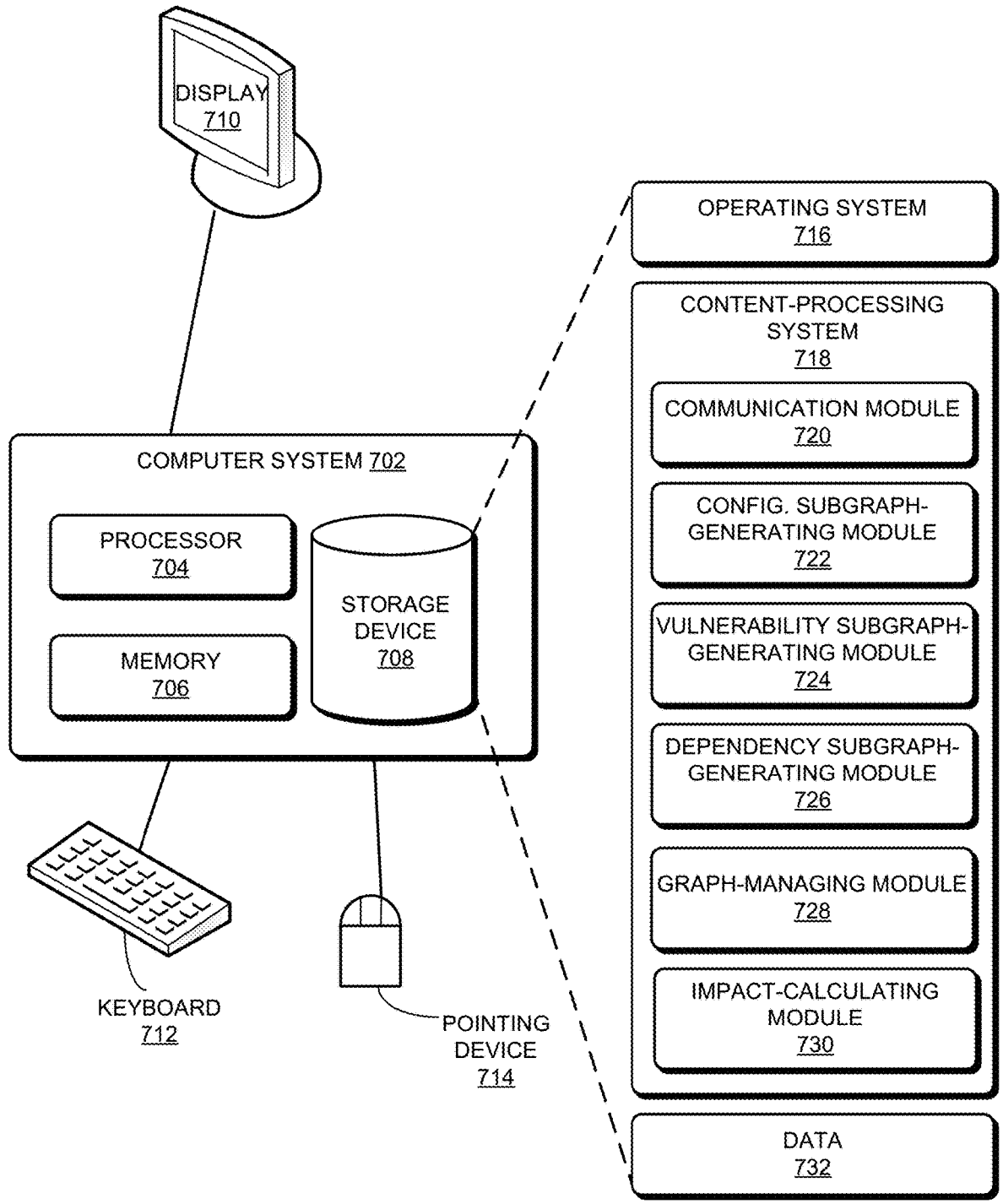
FIG. 7 illustrates an exemplary distributed computer and communication system that facilitates construction of a multi-layer graph, in accordance with an embodiment of the present application.

FIG. 7 illustrates an exemplary distributed computer and communication system 702 that facilitates construction of a multi-layer graph, in accordance with an embodiment of the present application. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 732.

Content-processing system 718 can include instructions, which when executed by computer system 702, can cause computer system 702 to perform methods and/or processes described in this disclosure. Specifically, content-processing system 718 may include instructions for sending and/or receiving/obtaining data packets to/from other network nodes across a computer network (communication module 720). A data packet can include a request, data, configuration information, vulnerability information, dependency information, a command, and a security or impact assessment or calculation.

Content-processing system 718 can further include instructions for constructing a multi-layer graph for a system with a plurality of components, wherein the multi-layer graph comprises a configuration subgraph, a vulnerability subgraph, and a dependency subgraph (communication module 720 and graph-managing module 728). Content-processing system 718 can include instructions for generating nodes in the configuration subgraph, including: nodes in a first class which encode information associated with a configuration parameter for a respective component, wherein the encoded information includes a name, a default value, a range of values, and a data type; and nodes in a second class which encode value assignments for configuration parameters and relationships between configuration parameters (configuration subgraph-generating module 722). Content-processing system 718 can include instructions for generating nodes in the vulnerability subgraph based on known vulnerabilities associated with a component, bad security practices, and best security practices (vulnerability subgraph-generating module 724). Content-processing system 718 can further include instructions for generating, in the dependency subgraph, nodes which represent a respective component and are labeled with a dependency type and a value associated with the respective component (dependency subgraph-generating module 726).

Content-processing system 718 can additionally include instructions for calculating an impact of a multiple-step attack of the system (impact-calculating module 730).

Data 732 can include any data that is required as input or that is generated as output by the methods and/or processes described in this disclosure. Specifically, data 732 can store at least: data; a command; a request; an identifier of an information source; an indicator or identifier of a hardware, software, middleware, or networking component of a system; an indicator or identifier of a configuration subgraph, a dependency subgraph, or a vulnerability node; a configuration subgraph node, a dependency subgraph node, or a vulnerability subgraph node; a directed edge in a subgraph; a directed edge between subgraphs; a configuration parameter; a configuration constraint; encoded information; a name; a default value; a range of values; a data type; a first or a second class of nodes; a value assignment; value assignments for configuration parameters; a relationship; relationships between configuration parameters; a known vulnerability; an identifier or indicator of a component, a bad security practice, or a best security practice; a probability value; a likelihood; metrics; a dependency type; a number representing a value associated with a component; a pool of components; an impact of a multi-step attack; an attack path; an impact function; a utility or a residual utility of a component; an attack surface metric; and a potential impact.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
constructing a multi-layer graph for a system with a plurality of components, wherein the multi-layer graph comprises a configuration subgraph, a vulnerability subgraph, and a dependency subgraph, and
wherein constructing the multi-layer graph comprises:
generating nodes in the configuration subgraph, including:
nodes in a first class which encode information associated with a configuration parameter for a respective component, wherein the encoded information includes a name, a default value, a range of values, and a data type; and
nodes in a second class which encode value assignments for configuration parameters and relationships between configuration parameters;
generating nodes in the vulnerability subgraph based on known vulnerabilities associated with a component, bad security practices, and best security practices; and
generating nodes in the dependency subgraph, wherein a directed edge from a configuration subgraph node in the second class to a vulnerability subgraph node indicates a constraint in the second class configuration subgraph node which creates a precondition to exploit a vulnerability indicated by the vulnerability subgraph node; and wherein a directed edge from a vulnerability subgraph node to a dependency subgraph node indicates an exposure factor of a respective component to an exploitation of a vulnerability indicated by the vulnerability subgraph node; and displaying, on a screen of a user device, one or more interactive elements for:
  viewing the constructed multi-layer graph comprising at least:
    the configuration subgraph and the generated configuration subgraph nodes, the vulnerability subgraph and the generated 32 vulnerability subgraph nodes, and the dependency subgraph and the generated dependency subgraph nodes;
    directed edges between nodes in a same subgraph;
    directed edges between configuration subgraph nodes and vulnerability subgraph nodes;
    directed edges between vulnerability subgraph nodes and dependency subgraph nodes; and
    directed edges between dependency subgraph nodes and configuration subgraph nodes;
  selecting one or more attack paths, wherein a respective attack path is traversed in a step of a multiple-step attack of the system; and
  sending a command to calculate an impact of the one or more selected attack paths;
receiving, based on an activation of the interactive element for sending the command, the command to calculate the impact of the one or more selected attack paths;
responsive to receiving the command to calculate the impact, calculating the impact of the one or more selected attack paths based on:
  executing the one or more selected attack paths sequentially or concurrently;
  a relative residual utility of a respective component before and after exploitation of a first vulnerability; and
  an original utility of the respective component; and
responsive to calculating the impact of the one or more selected attack paths, displaying, on the screen of the user device, an interactive element for viewing the calculated impact of the one or more selected attack paths.

2. The method of claim 1, wherein a component includes one or more of: a software component; a hardware component; a middleware component; and a networking component.

3. The method of claim 1, wherein generating the nodes for the vulnerability subgraph further comprises:
  identifying and encoding a negation of the known vulnerabilities associated with a component as a first set of known vulnerabilities, wherein the first set of known vulnerabilities are obtained from a public or a proprietary database;
  identifying the bad security practices and encoding the bad security practices as a second set of known vulnerabilities; and
  identifying the best security practices and encoding a negation of the best security practices as a third set of known vulnerabilities.

4. The method of claim 1, wherein generating the nodes for the vulnerability subgraph is further based on combining information from network scanners and vulnerability databases.

5. The method of claim 1,
  wherein the vulnerability subgraph includes directed edges between pairs of vulnerability subgraph nodes,
  wherein a vulnerability subgraph node represents a known vulnerability or a security condition,
  wherein a directed edge from a first vulnerability subgraph node to a second vulnerability subgraph node indicates that exploiting the first vulnerability subgraph node creates preconditions for exploiting the second vulnerability subgraph node, and
  wherein a respective directed edge is associated with a probability value.

6. The method of claim 5,
  wherein the probability value indicates a likelihood that the respective directed edge will be traversed in an attack or by an attacker, and
  wherein determining the probability value is based on one or more of:
    a complexity of security condition associated with the second vulnerability subgraph node;
    resources and time available to the attacker; and
    metrics based on the Common Vulnerability Scoring System (CVSS).

7. The method of claim 1, further comprising:
  wherein the dependency subgraph includes directed edges between pairs of dependency subgraph nodes,
  wherein a dependency subgraph node represents a respective component of the system and is labeled with a dependency type and a number representing a value associated with the respective component, and
  wherein a directed edge from a first dependency subgraph node to a second dependency subgraph node indicates that the first dependency subgraph node depends upon the second dependency subgraph node.

8. The method of claim 7,
  wherein the value associated with the respective component indicates an importance to the system of the respective component or the dependency subgraph node,
  wherein the dependency type labeled on the dependency subgraph node indicates a category of dependency relationships and includes one or more of:
    a redundancy type, wherein the respective component depends on a redundant pool of resources;
    a strict dependence type, wherein the respective component strictly depends on a first pool of other components, and wherein if a single component of the first pool of other components fails, the respective component fails to deliver any value; and
    a graceful degradation type, wherein the respective component depends on a second pool of other components, and wherein if a single component of the second pool of other components fails, the system continues to operate with a degraded performance.

9. The method of claim 1, wherein a directed edge from a dependency subgraph node to a configuration subgraph node in the first class indicates a list of configuration parameters associated with a component associated with the dependency subgraph node.

10. The method of claim 1, further comprising calculating an impact of the multiple-step attack of the system, which comprises:

defining an impact function for a single attack step based on a relative residual utility of a respective component before and after exploitation of a first vulnerability and further based on an original utility of the respective component, wherein the impact of the exploitation of the first vulnerability is based on other vulnerabilities exploited in prior attack steps and corresponding impact on the system, and wherein, in the multiple-step attack, a utility of each component of the system decreases after each attack step.

11. The method of claim 10, wherein calculating the impact of the multiple-step attack of the system further comprises one or more of:

defining a first attack surface metric based on a likelihood and a potential impact of each of a plurality of attack paths, wherein a respective attack path is traversed in a step of the multiple-step attack of the system, and wherein the respective attack path comprises at least:
  a first node in the vulnerability subgraph;
  a directed edge from the first node in the vulnerability subgraph to a second node in the dependency subgraph; and
  the second node in the dependency subgraph;

analyzing one or more attack paths based on probability values associated with directed edges between nodes which comprise a respective attack path; and defining a second attack surface metric based on assessing an impact of multiple steps of a multiple-step attack executed concurrently, wherein, at each step, all vulnerabilities for which preconditions are satisfied are exploited with a probability of one.

12. A computer system, the system comprising:
a processor; and
a storage device storing instructions that when executed by the processor cause the processor to perform a method, the method comprising:
constructing a multi-layer graph for a system with a plurality of components, wherein the multi-layer graph comprises a configuration subgraph, a vulnerability subgraph, and a dependency subgraph, and
wherein constructing the multi-layer graph comprises:
  generating nodes in the configuration subgraph, including:
    nodes in a first class which encode information associated with a configuration parameter for a respective component, wherein the encoded information includes a name, a default value, a range of values, and a data type; and
    nodes in a second class which encode value assignments for configuration parameters and relationships between configuration parameters;
  generating nodes in the vulnerability subgraph based on known vulnerabilities associated with a component, bad security practices, and best security practices; and
  generating nodes in the dependency subgraph,
  wherein a directed edge from a configuration subgraph node in the second class to a vulnerability subgraph node indicates a constraint in the second class configuration subgraph node which creates a precondition to exploit a vulnerability indicated by the vulnerability subgraph node; and
  wherein a directed edge from a vulnerability subgraph node to a dependency subgraph node indicates an exposure factor of a respective component to an exploitation of a vulnerability indicated by the vulnerability subgraph node;

displaying, on a screen of a user device, one or more interactive elements for:
  viewing the constructed multi-layer graph comprising at least:
    the configuration subgraph and the generated configuration subgraph nodes, the vulnerability subgraph and the generated vulnerability subgraph nodes, and the dependency subgraph and the generated dependency subgraph nodes;
    directed edges between nodes in a same subgraph;
    directed edges between configuration subgraph nodes and vulnerability subgraph nodes;
    directed edges between vulnerability subgraph nodes and dependency subgraph nodes; and
    directed edges between dependency subgraph nodes and configuration subgraph nodes;
  selecting one or more attack paths, wherein a respective attack path is traversed in a step of a multiple-step attack of the system; and
  sending a command to calculate an impact of the one or more selected attack paths;

receiving, based on an activation of the interactive element for sending the command, the command to calculate the impact of the one or more selected attack paths;

responsive to receiving the command to calculate the impact, calculating the impact of the one or more selected attack paths based on:
  executing the one or more selected attack paths sequentially or executed concurrently;
  a relative residual utility of a respective component before and after exploitation of a first vulnerability; and
  an original utility of the respective component; and responsive to calculating the impact of the one or more selected attack paths, displaying, on the screen of the user device, an interactive element for viewing the calculated impact of the one or more selected attack paths.

13. The computer system of claim 12, wherein a component includes one or more of: a software component; a hardware component; a middleware component; and a networking component.

14. The computer system of claim 12, wherein generating the nodes for the vulnerability subgraph further comprises:
identifying and encoding a negation of the known vulnerabilities associated with a component as a first set of known vulnerabilities, wherein the first set of known vulnerabilities are obtained from a public or a proprietary database;
identifying the bad security practices and encoding the bad security practices as a second set of known vulnerabilities; and
identifying the best security practices and encoding a negation of the best security practices as a third set of known vulnerabilities,
wherein the vulnerability subgraph includes directed edges between pairs of vulnerability subgraph nodes,
wherein a vulnerability subgraph node represents a known vulnerability or a security condition,
wherein a directed edge from a first vulnerability subgraph node to a second vulnerability subgraph node indicates that exploiting the first vulnerability subgraph node creates preconditions for exploiting the second vulnerability subgraph node, and wherein a respective directed edge is associated with a probability value which indicates a likelihood that the respective directed edge will be traversed in an attack or by an attacker.

15. The computer system of claim 12, further comprising:

wherein the dependency subgraph includes directed edges between pairs of dependency subgraph nodes, wherein a dependency subgraph node represents a respective component of the system and is labeled with a dependency type and a number representing a value associated with the respective component, wherein the value associated with the respective component indicates an importance to the system of the respective component or the dependency subgraph node, and wherein the dependency type labeled on the dependency subgraph node indicates a category of dependency relationships and includes one or more of:

a redundancy type, wherein the respective component depends on a redundant pool of resources;

a strict dependence type, wherein the respective component strictly depends on a first pool of other components, and wherein if a single component of the first pool of other components fails, the respective component fails to deliver any value; and a graceful degradation type, wherein the respective component depends on a second pool of other components, and wherein if a single component of the second pool of other components fails, the system continues to operate with a degraded performance, and wherein a directed edge from a first dependency subgraph node to a second dependency subgraph node indicates that the first dependency subgraph node depends upon the second dependency subgraph node.

16. The computer system of claim 12, wherein a directed edge from a dependency subgraph node to a configuration subgraph node in the first class indicates a list of configuration parameters associated with a component associated with the dependency subgraph node.

17. The computer system of claim 12, further comprising calculating an impact of the multiple-step attack of the system, which comprises:

defining an impact function for a single attack step based on a relative residual utility of a respective component before and after exploitation of a first vulnerability and further based on an original utility of the respective component, wherein the impact of the exploitation of the first vulnerability is based on other vulnerabilities exploited in prior attack steps and a corresponding impact on the system, and wherein, in the multiple-step attack, a utility of each component of the system decreases after each attack step.

18. The computer system of claim 12, wherein calculating the impact of the multiple-step attack of the system further comprises one or more of:

defining a first attack surface metric based on a likelihood and a potential impact of each of a plurality of attack paths, wherein a respective attack path is traversed in a step of the multiple-step attack of the system, and wherein the respective attack path comprises at least:

a first node in the vulnerability subgraph;

a directed edge from the first node in the vulnerability subgraph to a second node in the dependency subgraph; and the second node in the dependency subgraph;

analyzing one or more attack paths based on probability values associated with directed edges between nodes which comprise a respective attack path; and defining a second attack surface metric based on assessing an impact of multiple steps of a multiple-step attack executed concurrently, wherein, at each step, all vulnerabilities for which preconditions are satisfied are exploited with a probability of one.

19. A non-transitory computer-readable storage medium storing instructions that when executed by a computer cause the computer to perform a method, the method comprising:

constructing a multi-layer graph for a system with a plurality of components, wherein the multi-layer graph comprises a configuration subgraph, a vulnerability subgraph, and a dependency subgraph, and wherein constructing the multi-layer graph comprises:

generating nodes in the configuration subgraph, including:

nodes in a first class which encode information associated with a configuration parameter for a respective component, wherein the encoded information includes a name, a default value, a range of values, and a data type; and nodes in a second class which encode value assignments for configuration parameters and relationships between configuration parameters; and generating nodes in the vulnerability subgraph based on known vulnerabilities associated with a component, bad security practices, and best security practices; and generating nodes in the dependency subgraph, wherein a directed edge from a configuration subgraph node in the second class to a vulnerability subgraph node indicates a constraint in the second class configuration subgraph node which creates a precondition to exploit a vulnerability indicated by the vulnerability subgraph node; and wherein a directed edge from a vulnerability subgraph node to a dependency subgraph node indicates an exposure factor of a respective component to an exploitation of a vulnerability indicated by the vulnerability subgraph node; and displaying, on a screen of a user device, one or more interactive elements for:

viewing the constructed multi-layer graph comprising at least:

the configuration subgraph and the generated configuration subgraph nodes, the vulnerability subgraph and the generated vulnerability subgraph nodes, and the dependency subgraph and the generated dependency subgraph nodes;

directed edges between nodes in a same subgraph;

directed edges between configuration subgraph nodes and vulnerability subgraph nodes;

directed edges between vulnerability subgraph nodes and dependency subgraph nodes; and directed edges between dependency subgraph nodes and configuration subgraph nodes;

selecting one or more attack paths, wherein a respective 43 attack path is traversed in a step of a multiple-step attack of the system; and sending a command to calculate an impact of the one or more selected attack paths;

receiving, based on an activation of the interactive element for sending the command, the command to calculate the impact of the one or more selected attack paths;

responsive to receiving the command to calculate the impact, calculating the impact of the one or more selected attack paths based on:
  executing the one or more selected attack paths sequentially or concurrently;
  a relative residual utility of a respective component before and after exploitation of a first vulnerability; and
  an original utility of the respective component, and responsive to calculating the impact of the one or more selected attack paths, displaying, on the screen of the user device, an interactive element for viewing the calculated impact of the one or more selected attack paths.

20. The non-transitory computer-readable storage medium of claim 19, wherein generating the nodes for the vulnerability subgraph further comprises:
  identifying and encoding a negation of the known vulnerabilities associated with a component as a first set of known vulnerabilities, wherein the first set of known vulnerabilities are obtained from a public or a proprietary database;
  identifying the bad security practices and encoding the bad security practices as a second set of known vulnerabilities; and
  identifying the best security practices and encoding a negation of the best security practices as a third set of known vulnerabilities,
  wherein the vulnerability subgraph includes directed edges between pairs of vulnerability subgraph nodes,
  wherein a vulnerability subgraph node represents a known vulnerability or a security condition,
  wherein a directed edge from a first vulnerability subgraph node to a second vulnerability subgraph node indicates that exploiting the first vulnerability subgraph node creates preconditions for exploiting the second vulnerability subgraph node, and
  wherein a respective directed edge is associated with a probability value.

21. The non-transitory computer-readable storage medium of claim 20,
  wherein the probability value indicates a likelihood that the respective directed edge will be traversed in an attack or by an attacker, and
  wherein determining the probability value is based on one or more of:
    a complexity of security condition associated with the second vulnerability subgraph node;
    resources and time available to the attacker; and
    metrics based on the Common Vulnerability Scoring System (CVSS).

22. The non-transitory computer-readable storage medium of claim 19, wherein the method further comprises calculating an impact of the multiple-step attack of the system, which comprises:
  defining an impact function for a single attack step based on a relative residual utility of a respective component before and after exploitation of a first vulnerability and further based on an original utility of the respective component,
  wherein the impact of the exploitation of the first vulnerability is based on other vulnerabilities exploited in prior attack steps and corresponding impact on the system, and
  wherein, in the multiple-step attack, a utility of each component of the system decreases after each attack step.

23. The non-transitory computer-readable storage medium of claim 22, wherein calculating the impact of the multiple-step attack of the system further comprises one or more of:
  defining a first attack surface metric based on a likelihood and a potential impact of each of a plurality of attack paths, wherein a respective attack path is traversed in a step of the multiple-step attack of the system, and
  wherein the respective attack path comprises at least:
    a first node in the vulnerability subgraph;
    a directed edge from the first node in the vulnerability subgraph to a second node in the dependency subgraph; and
    the second node in the dependency subgraph;
  analyzing one or more attack paths based on probability values associated with directed edges between nodes which comprise a respective attack path; and
  defining a second attack surface metric based on assessing an impact of multiple steps of a multiple-step attack executed concurrently, wherein, at each step, all vulnerabilities for which preconditions are satisfied are exploited with a probability of one.

* * * * *